(12) United States Patent
Ishikawa

(10) Patent No.: US 8,002,058 B2
(45) Date of Patent: Aug. 23, 2011

(54) HYBRID VEHICLE AND CONTROL METHOD THEREOF

(75) Inventor: Naoki Ishikawa, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 133 days.

(21) Appl. No.: 12/501,442

(22) Filed: Jul. 12, 2009

(65) Prior Publication Data

US 2010/0006358 A1    Jan. 14, 2010

(30) Foreign Application Priority Data

Jul. 11, 2008   (JP) ................................ 2008-180915

(51) Int. Cl.
*B60W 10/04*    (2006.01)

(52) U.S. Cl. .................. 180/65.265; 180/65.21; 701/22; 701/70

(58) Field of Classification Search .............. 701/22, 701/70; 180/65.265, 65.21
See application file for complete search history.

(56) References Cited

U.S. PATENT DOCUMENTS

| | | | | |
|---|---|---|---|---|
| 5,735,770 A | * | 4/1998 | Omote et al. | 477/5 |
| 5,951,614 A | * | 9/1999 | Tabata et al. | 701/54 |
| 6,233,508 B1 | * | 5/2001 | Deguchi et al. | 701/22 |
| 6,311,116 B1 | * | 10/2001 | Lee | 701/70 |
| 6,440,041 B1 | * | 8/2002 | Riedle et al. | 477/107 |
| 6,602,164 B2 | * | 8/2003 | Yoshiaki et al. | 477/107 |
| 6,730,000 B1 | * | 5/2004 | Leising et al. | 477/110 |
| 6,746,366 B2 | * | 6/2004 | Tamor | 477/5 |
| 6,883,626 B2 | * | 4/2005 | Aoki et al. | 180/65.235 |
| 6,926,639 B2 | * | 8/2005 | Hopper | 477/110 |
| 7,134,982 B2 | * | 11/2006 | Ozeki et al. | 477/3 |
| 7,617,893 B2 | * | 11/2009 | Syed et al. | 180/65.21 |
| 7,823,668 B2 | * | 11/2010 | Ogata et al. | 180/65.265 |

FOREIGN PATENT DOCUMENTS

| | | |
|---|---|---|
| JP | 10023607 A | 1/1998 |
| JP | 2002256920 A | 9/2002 |
| JP | 2005306238 A | 11/2005 |

* cited by examiner

*Primary Examiner* — J. Allen Shriver, II
*Assistant Examiner* — James Triggs
(74) *Attorney, Agent, or Firm* — Gifford, Krass, Sprinkle, Anderson & Citkowski, P.C.

(57) ABSTRACT

When an accelerator opening Acc is equal to or more than a threshold value A2 upon a shift from a N position to a D position, a target torque T* is set to gradually change in comparison with when the accelerator opening Acc is less than the threshold value A2 based on a torque demand Trq corresponding to the accelerator opening Acc and a time constant τ or a gradual change restriction until a satisfaction of a release condition. An Engine 22, motors MG1 and MG2 are controlled so as to ensure a driving torque equivalent to the target torque T*.

4 Claims, 13 Drawing Sheets

HYBRID VEHICLE AND CONTROL METHOD THEREOF

The disclosure of Japanese Patent Application No. 2008-180915 filed Jul. 11, 2008 including specification, drawings and claims is incorporated herein by reference in its entirety.

BACKGROUND OF THE INVENTION

1. Field of the Invention

The present invention relates to a hybrid vehicle and a control method thereof.

2. Description of the Prior Art

Conventionally, there is known a hybrid vehicle that includes an internal combustion engine connected to an axle via a planetary gear mechanism, a generator connected to the planetary gear mechanism, and a motor connected to the axle via a transmission having two hydraulic brakes (for example, refer to Japanese patent laid-open publication No. 2005-306238). In the hybrid vehicle, when a start of the internal combustion engine is instructed while a shift position is set to a neutral position (N range) and inverters for the generator and the motor are shut down, the start of the internal combustion engine is prohibited until a vehicle speed becomes value "0" if the vehicle speed is not value "0". If the vehicle speed is value "0", the axle is locked by the two hydraulic brakes of the transmission and the shutdown of the inverters are released, then the internal combustion engine is started through a cranking by the generator. Thus, the two hydraulic brakes receive a reaction force acting on the axle while cranking the internal combustion engine by the generator, so that a shock due to the start of the internal combustion engine may be reduced even if an output of the motor is limited.

In the above hybrid vehicle, drivers may intentionally or accidentally depress an accelerator pedal or change the shift position from the neutral position to a drive position (D range and the like) while depressing the accelerator pedal when the shift position is set to the neutral position. However, the above patent document does not disclose how to control the hybrid vehicle in these states.

SUMMARY OF THE INVENTION

The present invention has an object to appropriately control a hybrid vehicle in response to an operation by a driver when a shift position is set to a neutral position.

The present invention accomplishes the demand mentioned above by the following configurations applied to a hybrid vehicle and a control method thereof.

A hybrid vehicle according to the present invention is a hybrid vehicle including an internal combustion engine that outputs a driving force, a motor that outputs a driving force, an accumulator that supplies and receives electric power from the motor, a shift position selecting device that allows a driver to select a neutral position and a drive position, an accelerator operation amount acquisition device that acquires an accelerator operation amount by the driver, a target driving force setting module, and a control module. The target driving force setting module sets a target driving force based on the acquired accelerator operation amount in response to a non-satisfaction of a predetermined condition upon a shift from the neutral position to the drive position. In response to a satisfaction of the predetermined condition upon the shift from the neutral position to the drive position, the target driving force setting module sets the target driving force so as to gradually change in comparison with that on the non-satisfaction of the predetermined condition based on the acquired accelerator operation amount and a predetermined gradual change restriction until a satisfaction of a predetermined release condition. The predetermined condition is satisfied when the acquired accelerator operation amount is equal to or more than a predetermined amount. The control module controls the internal combustion engine and the motor so as to ensure a driving force equivalent to the set target driving force.

Thus, the hybrid vehicle can be smoothly driven without a sudden start (hard acceleration) even if the driver intentionally or accidentally changes a shift position from the neutral position to the drive position while depressing the accelerator pedal when the shift position is set to the neutral position. Accordingly, the hybrid vehicle can be appropriately controlled in response to the accelerator operation and a shift operation by the driver when the shift position is set to the neutral position. The predetermined release condition may be satisfied when a difference between the target driving force set based on the gradual change restriction and the target driving force set as well as on the non-satisfaction of the predetermined condition acceptably becomes small. The predetermined release condition may be satisfied when an operation amount of the accelerator pedal is relatively increased or decreased. The drive position may include both a forward drive position and a reverse drive position.

The target driving force setting module may set a driving force demand for driving the vehicle based on the acquired accelerator operation amount. The target driving force setting module may set the target driving force based on the set driving force demand in response to the non-satisfaction of the predetermined condition. The target driving force setting module may set the target driving force so as to gradually change in comparison with that on the non-satisfaction of the predetermined condition based on the set driving force demand and the gradual change restriction in response to the satisfaction of the predetermined condition. Thus, the target driving force is appropriately and gradually changed, so that a behavior of the hybrid vehicle can be stabilized when the shift position is changed from the neutral position to the drive position while the accelerator pedal is depressed.

The target driving force setting module may set an effective accelerator operation amount to the acquired accelerator operation amount in response to the non-satisfaction of the predetermined condition and may set the target driving force based on the set effective accelerator operation amount. The target driving force setting module may set the effective accelerator operation amount so as to gradually change in comparison with that on the non-satisfaction of the predetermined condition based on the acquired accelerator operation amount and the gradual change restriction in response to the satisfaction of the predetermined condition and may set the target driving force based on the set effective accelerator operation amount. By setting the effective accelerator operation amount so as to gradually change in comparison with that on the non-satisfaction of the predetermined condition based on the driver's accelerator operation amount and the gradual change restriction and setting the target driving force based on the effective accelerator operation amount, the target driving force can be appropriately and gradually changed. In this case, the predetermined release condition may be satisfied when the difference between the effective accelerator operation amount set as well as on the non-satisfaction of the predetermined condition and the effective accelerator operation amount set based on the gradual change restriction acceptably becomes small.

The gradual change restriction may be configured to gradually change the target driving force or an effective accelerator operation amount through an annealing with a time constant, the effective accelerator operation amount being used to set the target driving force and corresponding to the driver's accelerator operation amount. Further, the gradual change restriction may be configured to gradually change the target driving force by a rate process based on an upper limit rate that is an allowable change amount in at least an increase side of the target driving force or an effective accelerator operation amount, the effective accelerator operation amount being used to set the target driving force and corresponding to the driver's accelerator operation amount.

The hybrid vehicle may further include a limit driving force setting module that sets a limit driving force that is a target value of the driving force to reduce a behavior unstable state including at least a state in which a wheel spin occurs when the hybrid vehicle is in the behavior unstable state, and a limit driving force setting release device that allows the driver to release a setting of the limit driving force by the limit driving force setting module. The target driving force setting module may set the target driving force based on the accelerator operation amount as well as on the non-satisfaction of the predetermined condition regardless of whether or not the predetermined condition is satisfied when the setting of the limit driving force by the limit driving force setting module is released. The driver may accept that the behavior of the hybrid vehicle become unstable in some degree when releasing the setting of the limit driving force by the limit driving force setting module. Accordingly, it is possible to relatively suddenly start (accelerate) the hybrid vehicle in accordance with the driver's intention by setting the target driving force based on the accelerator operation amount as well as on the non-satisfaction of the predetermined condition regardless of whether or not the predetermined condition is satisfied when the setting of the limit driving force is released by the driver.

The hybrid vehicle may further include an electric power-mechanical power input output structure connected to a predetermined axle and an engine shaft of the internal combustion engine and outputting at least a part of power from the internal combustion engine to the axle side with input/output of electric power and mechanical power. The electric power-mechanical power input output structure may supply and receive electric power from the accumulator. The motor may output power to the predetermined axle or another axle different from the predetermined axle. In this case, the electric power-mechanical power input output structure may include a power generation motor capable of inputting and outputting power and supplying and receiving electric power from the accumulator, and a three shaft-type power input output assembly connected with three shafts, the predetermined axle, the engine shaft of the internal combustion engine, and a rotating shaft of the power generation motor. The three shaft-type power input output assembly may be configured to input and output power to one remaining shaft, based on input and output of powers from and to any two shafts selected among the three shafts.

Another hybrid vehicle according to the present invention is a hybrid vehicle including an internal combustion engine that outputs a driving force, a motor that outputs a driving force, an accumulator that supplies and receives electric power from the motor, a shift position selecting device that allows a driver to select a neutral position and a drive position, an accelerator operation amount acquisition device that acquires an accelerator operation amount by the driver, a target driving force setting module, and a control module. The target driving force setting module sets a target driving force based on the acquired accelerator operation amount. When a predetermined condition is satisfied upon the shift from the neutral position to the drive position, the target driving force setting module sets the target driving force through an upper limit restriction process based on an upper limit value of the target driving force or the accelerator operation amount corresponding to the accelerator operation amount upon a shift from the neutral position to the drive position until a satisfaction of a predetermined release condition. The predetermined condition is satisfied when the acquired accelerator operation amount is equal to or more than a predetermined amount. The control module controls the internal combustion engine and the motor so as to ensure a driving force equivalent to the set target driving force.

By limiting the target driving force based on the upper limit value of the target driving force or the accelerator operation amount corresponding to the accelerator operation amount upon a shift from the neutral position to the drive position, it is possible to reduce a sudden start (hard acceleration) of the hybrid vehicle even if the driver intentionally or accidentally changes a shift position from the neutral position to the drive position while depressing the accelerator pedal when the shift position is set to the neutral position. Accordingly, the hybrid vehicle can be appropriately controlled in response to the accelerator operation and a shift operation by the driver when the shift position is set to the neutral position. The predetermined release condition may be satisfied when a predetermined time is elapsed after a start of the upper limit restriction process.

The another hybrid vehicle may further include a limit driving force setting module that sets a limit driving force that is a target value of the driving force to reduce a behavior unstable state including at least a state in which a wheel spin occurs when the hybrid vehicle is in the behavior unstable state, and a limit driving force setting release device that allows the driver to release a setting of the limit driving force by the limit driving force setting module. The target driving force setting module may set the target driving force based on the accelerator operation amount as well as on the non-satisfaction of the predetermined condition regardless of whether or not the predetermined condition is satisfied when the setting of the limit driving force by the limit driving force setting module is released. The driver may accept that the behavior of the hybrid vehicle become unstable in some degree when the setting of the limit driving force by the limit driving force setting module is released. Accordingly, it is possible to relatively suddenly start (accelerate) the hybrid vehicle in accordance with the driver's intention by setting the target driving force based on the accelerator operation amount as well as on the non-satisfaction of the predetermined condition regardless of whether or not the predetermined condition is satisfied when the setting of the limit driving force is released by the driver.

The another hybrid vehicle may further include an electric power-mechanical power input output structure connected to a predetermined axle and an engine shaft of the internal combustion engine and outputting at least a part of power from the internal combustion engine to the axle side with input/output of electric power and mechanical power. The electric power-mechanical power input output structure may supply and receive electric power from the accumulator. The motor may output power to the predetermined axle or another axle different from the predetermined axle. In this case, the electric power-mechanical power input output structure may include a power generation motor capable of inputting and outputting power and supplying and receiving electric power from the accumulator, and a three shaft-type power input output assembly connected with three shafts, the predetermined axle, the engine shaft of the internal combustion engine, and a rotating shaft of the power generation motor. The three shaft-type power input output assembly may be configured to input and output power to one remaining shaft, based on input and output of powers from and to any two shafts selected among the three shafts.

Still another hybrid vehicle according to the present invention is a hybrid vehicle including an internal combustion engine that outputs a driving force, a motoring device that performs a motoring of the internal combustion engine, a motor that outputs a driving force, an accumulator that supplies and receives electric power from the motoring device and the motor, a shift position selecting device that allows a driver to select a neutral position and a drive position, an accelerator operation amount acquisition device that acquires an accelerator operation amount by the driver, and a neutral control module. The neutral control module controls the internal combustion engine and the motoring device so that the internal combustion engine is started through the motoring by the motoring device when the acquired accelerator operation amount is equal to or more than a predetermined amount while a shift position is set to the neutral position and an operation of the internal combustion is stopped.

Thus, in the hybrid vehicle, a start of the internal combustion engine may notify the driver that the accelerator operation is made while the shift position is set to the neutral position, thereby providing the driver with operational feeling same as conventional vehicles having only an internal combustion engine as a drive source. Accordingly, the hybrid vehicle can be appropriately controlled in response to the accelerator operation by the driver when the shift position is set to the neutral position.

The neutral control module may control the internal combustion engine so as to autonomously operate when the acquired accelerator operation amount is less than a predetermined threshold value after the internal combustion engine is started while the shift position is set to the neutral position and the operation of the internal combustion is stopped. The neutral control module may control the internal combustion engine and the motoring device so that a rotational speed of the internal combustion engine becomes a value corresponding to the acquired accelerator operation amount when the acquired accelerator operation amount is equal to or more than the predetermined amount after the internal combustion engine is started while the shift position is set to the neutral position and the operation of the internal combustion is stopped. Thus, it is possible to appropriately operate the internal combustion engine after the start of the engine while the shift position is set to the neutral position and to adequately notify the driver that the accelerator operation is made while the shift position is set to the neutral position.

The neutral control module does not make the internal combustion engine start and informs the driver that an accelerator operation is made while the shift position is set to the neutral position when a predetermined engine start prohibition condition is satisfied and the acquired accelerator operation amount is equal to or more than a predetermined amount while the shift position is set to the neutral position and the operation of the internal combustion is stopped. Thus, it is possible to notify the driver that the accelerator operation is made while the shift position is set to the neutral position even if the start of the internal combustion engine is prohibited when the accelerator operation amount becomes the predetermined amount while the shift position is set to the neutral position and the operation of the internal combustion is stopped.

The motoring device may be an electric power-mechanical power input output structure connected to a predetermined axle and an engine shaft of the internal combustion engine and outputting at least a part of power from the internal combustion engine to the axle side with input/output of electric power and mechanical power. The electric power-mechanical power input output structure may supply and receive electric power from the accumulator. The motor may output power to the predetermined axle or another axle different from the predetermined axle. In this case, the electric power-mechanical power input output structure may include a power generation motor capable of inputting and outputting power and supplying and receiving electric power from the accumulator, and a three shaft-type power input output assembly connected with three shafts, the predetermined axle, the engine shaft of the internal combustion engine, and a rotating shaft of the power generation motor. The three shaft-type power input output assembly may be configured to input and output power to one remaining shaft, based on input and output of powers from and to any two shafts selected among the three shafts.

A control method of a hybrid vehicle according to the present invention is a control method of a hybrid vehicle including an internal combustion engine that outputs a driving force, a motor that outputs a driving force, an accumulator that supplies and receives electric power from the motor, and a shift position selecting device that allows a driver to select a neutral position and a drive position. The method sets a target driving force based on an accelerator operation amount by the driver in response to a non-satisfaction of a predetermined condition upon a shift from the neutral position to the drive position. In response to a satisfaction of the predetermined condition upon the shift from the neutral position to the drive position, the method sets the target driving force so as to gradually change in comparison with that on the non-satisfaction of the predetermined condition based on the accelerator operation amount and a predetermined gradual change restriction until a satisfaction of a predetermined release condition. The predetermined condition being satisfied when the accelerator operation amount is equal to or more than a predetermined amount. Then, the method controls the internal combustion engine and the motor so as to ensure a driving force equivalent to the set target driving force.

According to the method, it is possible to smoothly drive the hybrid vehicle without a sudden start (hard acceleration) even if the driver intentionally or accidentally changes a shift position from the neutral position to the drive position while depressing the accelerator pedal when the shift position is set to the neutral position. Accordingly, the hybrid vehicle can be appropriately controlled in response to the accelerator operation and a shift operation by the driver when the shift position is set to the neutral position.

Another control method of a hybrid vehicle according to the present invention is a control method of a hybrid vehicle including an internal combustion engine that outputs a driving force, a motor that outputs a driving force, an accumulator that supplies and receives electric power from the motor, and a shift position selecting device that allows a driver to select a neutral position and a drive position. The method sets a target driving force based on an accelerator operation amount by the driver. When a predetermined condition is satisfied upon the shift from the neutral position to the drive position, the predetermined condition being satisfied when the accelerator operation amount is equal to or more than a predetermined amount, the method sets the target driving force through an upper limit restriction process based on an upper limit value of the target driving force or the accelerator operation amount corresponding to the accelerator operation amount upon a shift from the neutral position to the drive position until a satisfaction of a predetermined release condition. Then, the method controls the internal combustion engine and the motor so as to ensure a driving force equivalent to the set target driving force.

According to the method, it is possible to smoothly drive the hybrid vehicle without a sudden start (hard acceleration) even if the driver intentionally or accidentally changes a shift position from the neutral position to the drive position while depressing the accelerator pedal when the shift position is set to the neutral position. Accordingly, the hybrid vehicle can be appropriately controlled in response to the accelerator operation and a shift operation by the driver when the shift position is set to the neutral position.

Still another control method of a hybrid vehicle according to the present invention is a control method of a hybrid vehicle including an internal combustion engine that outputs a driving force, a motoring device that performs a motoring of the internal combustion engine, a motor that outputs a driving force, an accumulator that supplies and receives electric power from the motoring device and the motor, and a shift position selecting device that allows a driver to select a neutral position and a drive position. The method controls the internal combustion engine and the motoring device so that the internal combustion engine is started through the motoring by the motoring device when an accelerator operation amount by the driver is equal to or more than a predetermined amount while a shift position is set to the neutral position and an operation of the internal combustion is stopped.

According to the method, a start of the internal combustion engine may notify the driver that the accelerator operation is made while the shift position is set to the neutral position, thereby providing the driver with operational feeling same as conventional vehicles having only an internal combustion engine as a drive source. Accordingly, the hybrid vehicle can be appropriately controlled in response to the accelerator operation by the driver when the shift position is set to the neutral position.

DESCRIPTION OF THE PREFERRED EMBODIMENTS

Hereinafter, the best mode for carrying out the invention will be described with reference to embodiments.

Figure 1:
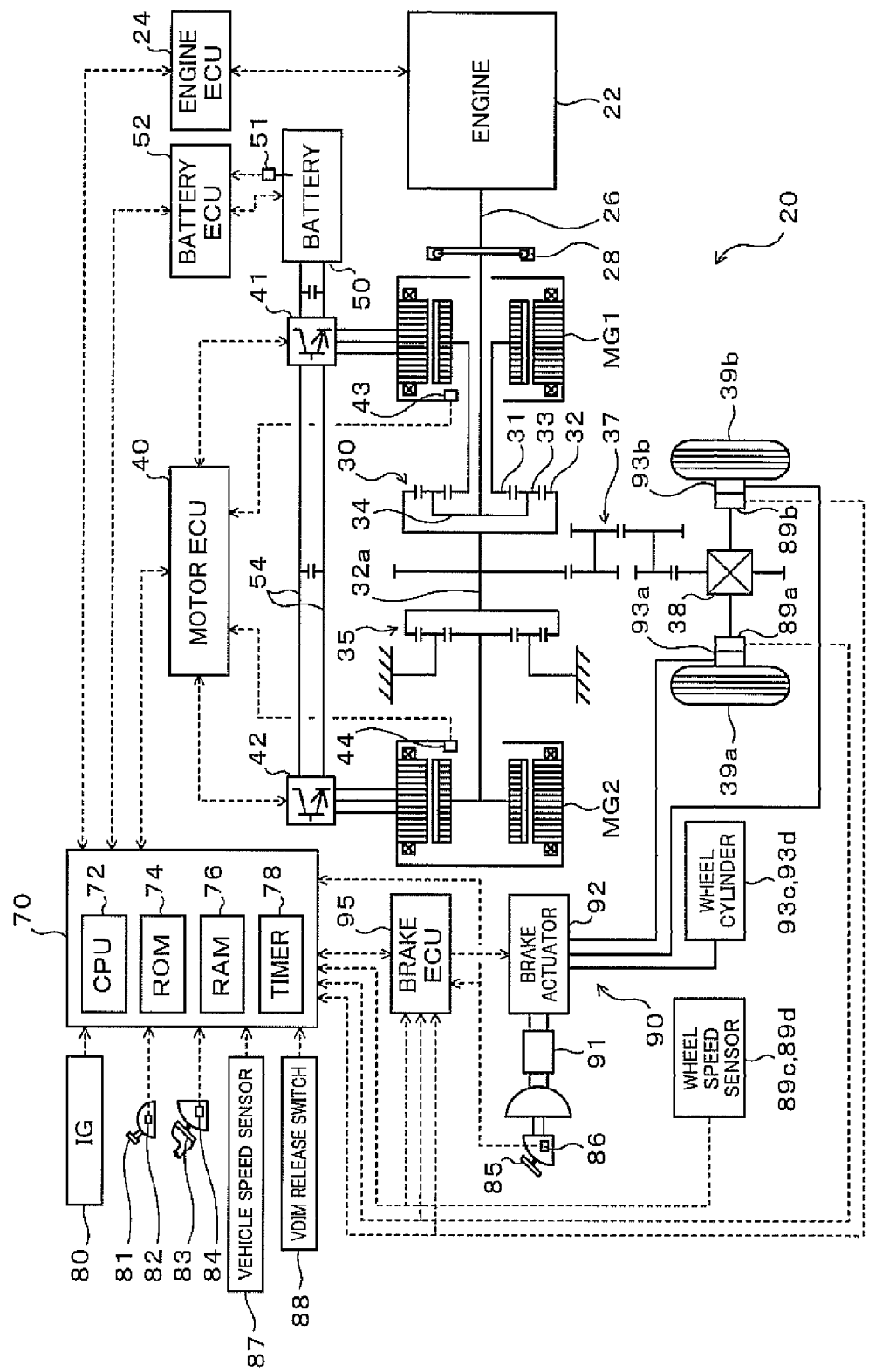
FIG. 1 is a schematic block diagram of a hybrid vehicle 20 according an embodiment of the present invention.

FIG. 1 is a schematic block diagram of a hybrid vehicle 20 according an embodiment of the present invention. The hybrid vehicle 20 of the illustrated configuration includes an engine 22, a three shaft-type power distribution integration mechanism 30 connected via a damper 28 to a crankshaft (engine shaft) 26 of the engine 22, a motor MG1 connected to the power distribution integration mechanism 30 and designed to have power generation capability, a reduction gear 35 attached to a ring gear shaft 32a as an axle connected to the power distribution integration mechanism 30, a motor MG2 connected to the ring gear shaft 32a via the reduction gear 35, an electrically controlled hydraulic brake unit 90 (hereinafter referred to as "brake unit") capable of providing a frictional braking force, and a hybrid electronic control unit 70 (hereinafter referred to as "hybrid ECU") configured to control the operations of the whole hybrid vehicle 20.

The engine 22 is constructed as an internal combustion engine designed to consume a hydrocarbon fuel, such as gasoline or light oil, and thereby generating power. The engine 22 is under operation controls, such as a fuel injection control, an ignition timing control, an intake air flow control and the like by an engine electronic control unit 24 (hereinafter referred to as "engine ECU"). The engine ECU 24 inputs diverse signals from various sensors mounted on the engine 22 to measure and detect the operating conditions of the engine 22. The engine ECU 24 establishes communication with the hybrid ECU 70 to control the operations of the engine 22 in accordance with control signals from the hybrid ECU 70 and the diverse signals from the various sensors and outputs data regarding the operating conditions of the engine 22 to the hybrid ECU 70 according to the requirements.

The power distribution integration mechanism 30 includes a sun gear 31 as an external gear, a ring gear 32 as an internal gear arranged concentrically with the sun gear 31, multiple pinion gears 33 arranged to engage with the sun gear 31 and with the ring gear 32, and a carrier 34 arranged to hold the multiple pinion gears 33 in such a manner as to allow both their revolutions and their rotations on their axes. The power distribution integration mechanism 30 is thus constructed as a planetary gear mechanism including the sun gear 31, the ring gear 32, and the carrier 34 as the rotational elements of differential motions. The carrier 34 as an engine-side rotational element, the sun gear 31, and the ring gear 32 as an axle-side rotational element in the power distribution integration mechanism 30 are respectively connected to the crankshaft 26 of the engine 22, to the motor MG1, and to the reduction gear 35 via the ring gear shaft 32a. When the motor MG1 functions as a generator, the power distribution integration mechanism 30 distributes the power of the engine 22 input via the carrier 34 into the sun gear 31 and the ring gear 32 corresponding to their gear ratio. When the motor MG1 functions as a motor, on the other hand, the power distribution integration mechanism 30 integrates the power of the engine 22 input via the carrier 34 with the power of the motor MG1 input via the sun gear 31 and outputs the integrated power to the ring gear 32. The power output to the ring gear 32 is transmitted from the ring gear shaft 32a through a gear mechanism 37 and a differential gear 38 and is eventually output to drive wheels 39a and 39b of the hybrid vehicle 20.

The motors MG1 and MG2 are constructed as known synchronous motor generators to enable operations as both a generator and a motor. The motors MG1 and MG2 receive and supply electric power to a battery 50 as a secondary cell via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged upon the balance of the input and output of electric powers between the motors MG1 and MG2. Both the motors MG1 and MG2 are driven and controlled by a motor electronic control unit 40 (hereinafter referred to as "motor ECU"). The motor ECU 40 inputs various signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 also computes rotational speeds Nm1 and Nm2 of the rotors in the motors MG1 and MG2 according to a rotational speed computation routine (not shown) based on the output signals of the rotational position detection sensors 43 and 44. The motor ECU 40 establishes communication with the hybrid ECU 70 to drive and control the motors MG1 and MG2 in response to control signals received from the hybrid ECU 70 and to output data regarding the operating conditions of the motors MG1 and MG2 to the hybrid ECU 70 according to the requirements.

The battery 50 is under control and management of a battery electronic control unit 52 (hereinafter referred to as "battery ECU"). The battery ECU 52 inputs various signals required for management and control of the battery 50, for example, an inter-terminal voltage from a voltage sensor (not shown) located between terminals of the battery 50, a charge-discharge current from a current sensor (not shown) located in the power line 54 connecting with the output terminal of the battery 50, and a battery temperature Tb from a temperature sensor 51 attached to the battery 50. The battery ECU 52 outputs data regarding the operating conditions of the battery 50 by data communication to the hybrid ECU 70 and the engine ECU 24 according to the requirements. The battery ECU 52 also performs various arithmetic operations for management and control of the battery 50. A remaining charge or state of charge SOC of the battery 50 is calculated from an integrated value of the charge-discharge current measured by the current sensor. A charge-discharge power demand Pb* is set based on the calculated state of charge SOC of the battery 50. An input limit Win as an allowable charging electric power to be charged in the battery 50 and an output limit Wout as an allowable discharging electric power to be discharged from the battery 50 are set corresponding to the calculated state of charge SOC and the battery temperature Tb. The input and output limits Win and Wout of the battery 50 are set by setting a basic value depending on the battery temperature Tb and setting an input limit correction coefficient and an output limit correction coefficient based on the state of charge SOC of the battery 50, and then multiplying the set basic value of the input and output limits Win and Wout by the set correction coefficient.

The brake unit 90 includes a master cylinder 91, a fluid pressure (hydraulic) brake actuator 92, wheel cylinders 93a-93d that are provided for the wheels 39a and 39b as drive wheels and for other wheels and operate brake pads capable of sandwiching a brake discs mounted to the respective wheels and applying a frictional braking force to the corresponding wheel, wheel cylinder pressure sensors that are provided for each of the wheel cylinders 93a-93d and detect a hydraulic pressure (wheel cylinder pressure) of the corresponding wheel cylinder, and a brake electronic control unit (hereafter, referred to as "brake ECU") 95 that controls the brake actuator 92. Although not illustrated in the drawings, the brake actuator 92 has a pump and an accumulator as a hydraulic source, a master cylinder cut solenoid valve that controls a communicating state between the master cylinder 91 and the wheel cylinders 93a-93d, a stroke simulator that creates a reaction force against a pedal depression force corresponding to an amount of depression of a brake pedal 85, and the like. The brake ECU 95 inputs via signal lines (not shown) a master cylinder pressure from a master cylinder pressure sensor (not shown) that detects the master cylinder pressure, wheel cylinder pressures from the wheel cylinder pressure sensors, wheel speeds of from wheel speed sensors 89a and 89b that detect the wheel speeds of the driving wheels 39a and 39b and wheel speed sensors 89c and 89d that detect the wheel speeds of trailing wheels (not shown), a steering angle from a steering angle sensor (not shown), and the like. The brake ECU 95 also exchanges various signals by communication with the hybrid ECU 70 and the like. The brake ECU 95 controls the brake actuator 92 so that a frictional braking torque acts on the wheels 39a and 39b and other wheels. The frictional braking torque corresponds to the share to be applied by the brake unit 90 out of the total braking torque to be applied to the hybrid vehicle 20 based on a vehicle speed V, a brake pedal stroke BS that indicates a depression amount of the brake pedal 85 and the like. Further, the brake ECU 95 controls the brake actuator 92 so that the frictional braking torque acts on the wheels 39a and 39b and other wheels irrespective of a depression operation of the brake pedal 85 by the driver.

In order to ensure stability when a wheel spin of the driving wheel or a side skid of the vehicle occurs, the brake ECU 95 is also capable of performing so-called an anti lock control (ABS), a traction control (TRC) for reducing the wheel spin of at lease one of the driving wheels 39a and 39b, a vehicle stability control (VSC) for stably controlling an attitude of the hybrid vehicle 20 during a cornering, and the like in accordance with diverse input signals. When performing the VSC or the like, the brake ECU 95 in the embodiment performs a Vehicle Dynamics Integrated Management (VDIM) that integrates a control of the brake actuator 92, a driving control and a steering control in stead of independently controlling the brake actuator 92 and the like. When performing the traction control (TRC), for example, the brake ECU 95 determines that the wheel spin occurs in a certain driving of which a slip speed that is a difference between an estimated body speed and a body speed corresponding to the wheel speed of the certain driving wheel becomes equal to or more than a predetermined speed that is relatively small (for example, 1-5 km/h). Then, the brake ECU 95 controls the brake actuator 92 so that a braking torque corresponding to the slip speed is applied to the certain driving wheel, and outputs a limit torque Tlim that is to be output to the ring gear shaft 32a in order to reduce a behavior unstable state such as a wheel spin state by limiting an output of torque from the motor MG2 mainly to the hybrid ECU 70. Further, a VDIM release switch 88 enabling to release the Vehicle Dynamics Integrated Management such as the TRC by the brake ECU 95 is connected to the brake ECU 95 of the embodiment in consideration of drivers excelling in a driving and disliking driving assistance from the vehicle side. When the Vehicle Dynamics Integrated Management is released through an operation of the VDIM release switch 88 by the driver, the brake ECU 95 sets a predetermined VDIM release flag Fvcan to value "1" that is normally set to value "0" and sets a predetermined VDIM flag Fvdim that indicates whether or not the Vehicle Dynamics Integrated Management is performed to value "0" without performing the Vehicle Dynamics Integrated Management. On the other hand, when the Vehicle Dynamics Integrated Management is not released with the VDIM release switch 88 by the driver, the brake ECU 95 sets the VDIM release flag Fvcan to value "0". Further, when the Vehicle Dynamics Integrated Management is not released with the VDIM release switch 88 and is to be performed, the brake ECU 95 sets the VDIM flag Fvdim to value "1". Then, the brake ECU 95 calculates a target vehicle behavior and an actual vehicle state amount based on signals from a G sensor, a yaw rate sensor and the like (not shown), and sets command values for the brake actuator 92, the limit torque Tlim for the hybrid ECU 70, a steering correction amount for a steering electronic control unit and the like in accordance with the calculated target vehicle behavior and actual vehicle state amount. In the embodiment, the brake ECU 95 sets the VDIM flag Fvdim to value "0" without performing the Vehicle Dynamics Integrated Management when the management is not released with the VDIM release switch 88 by the driver and is not required.

The hybrid ECU 70 is constructed as a microprocessor including a CPU 72, a ROM 74 configured to store processing programs, a RAM 76 configured to temporarily store data, a timer 78 configured to perform a time measurement process in response to a time measurement command, input and output ports (not shown), and a communication port (not shown). The hybrid ECU 70 inputs, via its input port, an ignition signal from an ignition switch (start switch) 80, a shift position SP or a current setting position of a shift lever 81 from a shift position sensor 82, an accelerator opening Acc or the driver's depression amount (operation amount) of an accelerator pedal 83 from an accelerator pedal position sensor 84, a brake pedal stroke BS or the driver's depression amount of a brake pedal 85 from a brake pedal stroke sensor 86, a vehicle speed V from a vehicle speed sensor 87, and wheel speeds from the wheel speed sensors 89a-89d. As described above, the hybrid ECU 70 is connected via the communication port with the engine ECU 24, the motor ECU 40, the battery ECU 52, the brake ECU 95 and the like, and exchanges various control signals and data with the engine ECU 24, the motor ECU 40, the battery ECU 52, the brake ECU 95 and the like. In the embodiment, the hybrid vehicle 20 includes, as shift positions of the shift lever 81, a parking position (P position) used at parking, a reverse drive position (R position) for reverse driving, a neutral position (N position) in which the engine 22 is basically stopped and the inverters 41 and 42 are shut down (all of switching elements are turned off), a forward drive position (D position) for forward driving, and a brake position (B position) enabling to ensure more braking force in an acceleration off state than the D position.

The hybrid vehicle 20 of the embodiment constructed as described above basically sets a target torque T* that is a target value of torque to be output to the ring gear shaft 32a or the axle based on the vehicle speed V and the accelerator opening Acc corresponding to the driver's depression amount of the accelerator pedal 83, and controls the operations of the engine 22, the motors MG1 and MG2 to ensure output of torque based on the target torque T* to the ring gear shaft 32a. There are several drive control modes of the engine 22, the motors MG1 and MG2. In a torque conversion drive mode, while the engine 22 is driven and controlled to ensure output of power equivalent to the target torque T*, the motors MG1 and MG2 are driven and controlled to enable all the output power of the engine 22 to be subjected to torque conversion by the power distribution integration mechanism 30, the motors MG1 and MG2 and to be output to the ring gear shaft 32a. In a charge-discharge drive mode, the engine 22 is driven and controlled to ensure output of power corresponding to the sum of a power demand based on the target torque T* and electric power required for charging the battery 50 or electric power to be discharged from the battery 50. The motors MG1 and MG2 are driven and controlled to enable all or part of the output power of the engine 22 with charge or discharge of the battery 50 to be subjected to torque conversion by the power distribution integration mechanism 30, the motors MG1 and MG2 and to ensure output of the power demand to the ring gear shaft 32a. In a motor drive mode, the motor MG2 is driven and controlled to ensure output of power equivalent to the target torque T* to the ring gear shaft 32a, while the engine 22 stops its operation.

Figure 2:
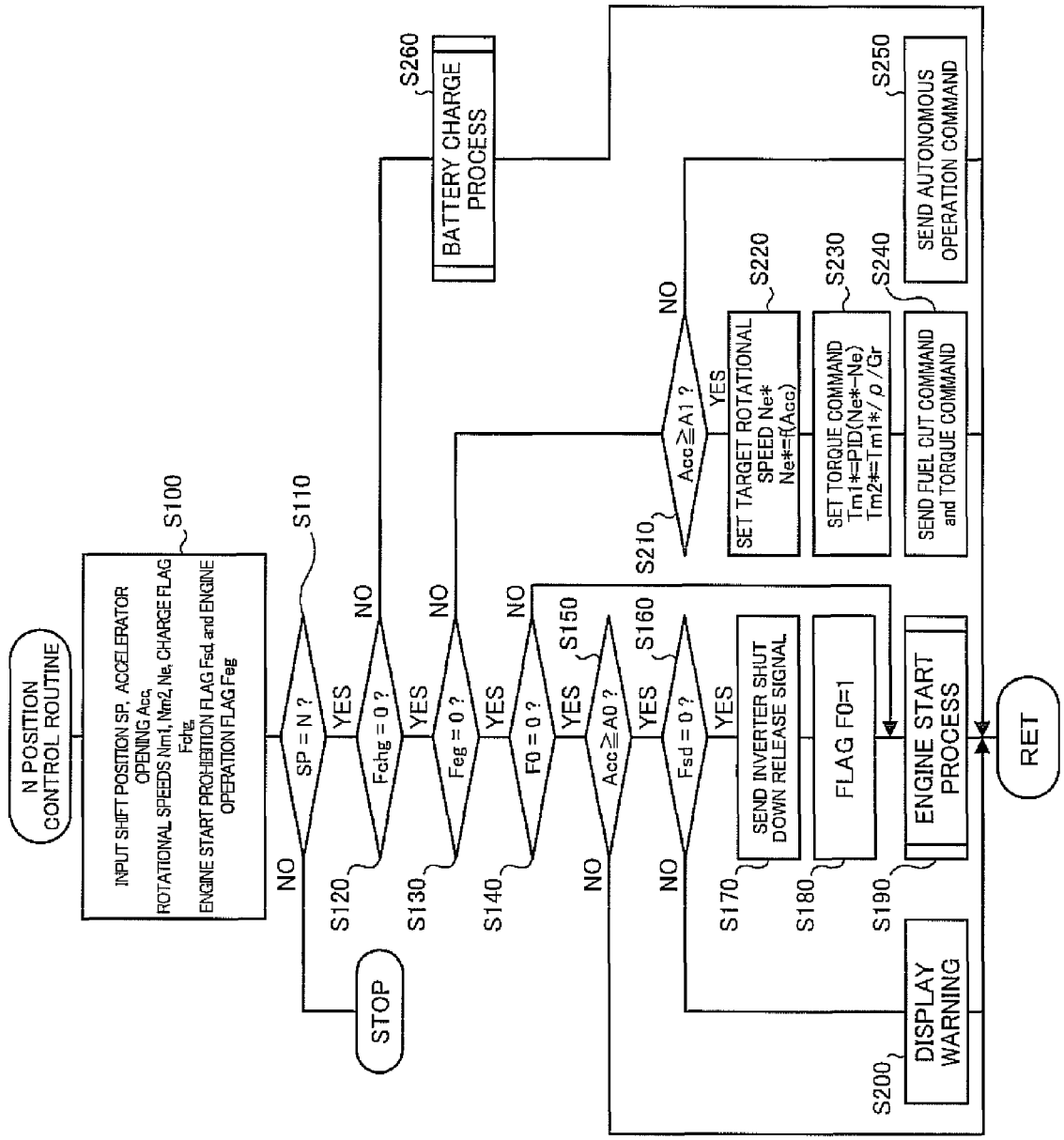
FIG. 2 is a flowchart illustrating an example of a N position control routine executed by a hybrid electric control unit 70.

Next, an operation of the hybrid vehicle 20 when the shift position SP is set to the N position (neutral position) by the driver will be described. FIG. 2 is a flowchart illustrating an example of a N position control routine that is executed by the hybrid ECU 70 at predetermined time intervals (for example, at every several msec) when the shift position SP is set to the N position while the hybrid vehicle 20 is stopped. As described above, the engine 22 is basically stopped and the inverters 41 and 42 are shut down in the hybrid vehicle 20 when the shift position is set to the N position.

At start of the N position control routine of FIG. 2, the CPU 72 of the hybrid ECU 70 executes an input process of data required for the control such as the shift position SP from the shift position sensor 82, the accelerator opening Acc from the accelerator pedal position sensor 84, the rotational speeds Nm1, Nm2 of the motors MG1, MG2, a rotational speed Ne of the engine 22, a value of a charge flag Fchg, a value of an engine start prohibition flag Fsd, a value of an engine operation flag Feg and the like (Step S100). The rotational speeds Nm1 and Nm2 of the motors MG1 and MG2 are input from the motor ECU 40 by communication. The rotational speed Ne of the engine 22 is calculated based on a signal from a crank position sensor (not shown) mounted on the crank shaft 26 by the engine ECU 24 and is input from the engine ECU 24 by communication. The charge flag Fchg is normally set value "0" by the battery ECU 52 and is set to value "1" when the battery 50 is to be forcefully charged in accordance with the state of charge SOC. The charge flag Fchg is input from the battery ECU 52 by communication. The engine start prohibition flag Fsd is input from the engine ECU 24 and battery ECU 52 by communication. In the embodiment, the engine ECU 24 sets the engine start prohibition flag Fsd to value "0" when a start (operation) of the engine 22 is permitted in accordance with various parameters indicating states of the engine 22 and sets the engine start prohibition flag Fsd to value "1" when the engine is not to be started due to excessively high temperature of a cooling water for example. Also, the battery ECU 52 sets the engine start prohibition flag Fsd to value "0" when a start (operation) of the engine 22 is permitted in accordance with the state of charge SOC, the input and output limits Win, Wout and the like and sets the engine start prohibition flag Fsd to value "1" when the engine is not to be started due to excessively low state of charge lever of the battery 50 for example. The engine operation flag Feg is set value "0" by the engine ECU 24 while the engine 22 is stopped and is set to value "1" when the engine 22 is operated. The engine operation flag Feg is input from the engine ECU 24 by communication.

After the data input at Step S100, the CPU 72 determines whether or not the input shift position SP is the N position (Step S110) and determines whether or not the charge flag Fchg is value "0" (Step S120) when the shift position SP is the N position. When the charge flag Fchg is value "0" and there is necessary to forcefully charge the battery 50, the CPU 72 determines whether or not the engine operation flag Feg is value "0" (Step S130). When the engine operation flag Feg is value "0" and the operation of the engine 22 is stopped, the CPU 72 determines whether or not a flag F0 is value "0" (Step S140). The flag F0 is set to value "1" during a start operation of the engine 22. Further, when the flag F0 is value "0" and the start operation of the engine 22 is not performed, the CPU 72 determines whether or not the acceleration opening Acc input at step S100 is equal to or more than a predetermined threshold value A0 (Step S150). In the embodiment, the threshold value A0 is set to a relatively small positive value defined in consideration of a dead zone of the accelerator pedal 83. When the accelerator opening Acc is less than the threshold value A0 and the accelerator pedal 83 may not be depressed by the driver, the CPU 72 returns to Step S100 to repeat the processes of and after Step S100.

When determined that the accelerator opening Acc is equal to or more than the threshold value A0 as Step S150, the CPU 72 determines whether or not the engine start prohibition flat Fsd is value "0" (Step S160). When the engine start prohibition flag Fsd is value "0" and the start of the engine 22 is not prohibited, the CPU 72 send a inverter shut down release command for releasing the shut down of the inverters 41 and 42 to the motor ECU 40 (Step S170) and set the above flag F0 to value "1" (Step S180). Then, the CPU 72 starts an engine start process (Step S190) and returns to Step S100 to repeat the processes of and after Step S100. After the start of the engine start process as Step S190, a negative determination is basically made at Step S140 and the process a Step S190 is performed when the shift position SP is held in the N position. The engine start process of Step S190 sets a torque command of the motor MG1 based on a predetermined map for cranking the engine 22 by the motor MG1 and sets a torque command of the motor MG2 to cancel torque acting on the ring gear shaft 32a through the cranking of the engine 22 and to hold the rotational speed of the ring gear shaft 32a at value "0" (to maintain a stop of the hybrid vehicle 20). At Step S190, the CPU 72 also sends command signals for instructing a start of a fuel injection control and an ignition timing control to the engine ECU 24 at a predetermined timing after the start of the cranking of the engine 22. When an explosion of the engine 22 is completed and the engine start process is terminated, the hybrid ECU 70 sets the flag F0 to value "0" and the engine ECU 24 sets the engine operation flag Feg to value "1". As described above, in the hybrid vehicle 20 of the embodiment, the engine 22, the motors MG1 and MG2 are controlled so that torque for driving the vehicle is not output to the ring gear shaft 32a and the engine 22 is started through the cranking (motoring) by the motor MG1 when the accelerator opening Acc by the driver becomes equal to or more than the threshold value A0 while the shift position SP is set to the N position and the operation of the engine 22 is stopped. Accordingly, in the hybrid vehicle 20, the start of the engine 22 may notify the driver that an accelerator operation is made while the shift position SP is set to the N position, thereby providing the driver with operational feeling same as conventional vehicles having only an internal combustion engine as a drive source. After the start of the engine 22, the engine 22 is autonomously operated at a predetermined autonomous rotational speed (an idle speed, for example) so as not to output torque.

On the other hand, the CPU 72 sends a command signal for displaying a warning message such as "Accelerator pedal is depressed while setting "N" position." on a display mounted on an instrument panel or a display of a car navigation system to a meter electric control unit that controls the display (not shown) when the engine start prohibition flag Fsd is value "1" and the start of the engine 22 is prohibited (Step S160) after a determination at Step S150 that the accelerator opening Acc is equal to or more than the threshold value A0 (Step S200). Then, the CPU 72 returns to Step S100 to repeat the processes of and after Step S100. That is, when a negative determination is made at Step S160, the engine 22 is not started and the warning message is displayed on the display so as to inform the driver that the accelerator operation is made while the shift position SP is set to the N position. At Step S200, a predetermined warning lamp mounted on the instrument panel or the like may be illuminated or blinked instead of the warning message on the display. Further, a warning sound may be generated at Step S200.

When the shift position SP is held in the N position after the engine 22 is started through the engine start process (Step S190), a negative determination is basically made at Step S130 and the CPU 72 determines whether or not the acceleration opening Acc input at step S100 is equal to or more than a predetermined threshold value A1 (Step S210). In the embodiment, the threshold value A1 is a positive value larger than the above value A0, however, the threshold value A1 may be set to the same value as the value A0. When determined that the accelerator opening Acc is equal to or more than the threshold value A1 at Step S210, the CPU 72 sets a target rotational speed Ne* of the engine 22 based on the accelerator opening input at Step S100 (Step S220). In the embodiment, the target rotational speed Ne* corresponding to the given accelerator opening Acc is derived from a target rotational speed setting map (not shown) previously stored in the ROM 74 and defining a relationship between the accelerator opening Acc and the target rotational speed Ne* of the engine 22 during the a selection of the N position at Step S220. Then, the CPU 72 sets a torque command Tm1* of the motor MG1 by calculation of below Equation (1) based on the target rotational speed Ne* set at Step S220 and a current rotational speed Ne of the engine 22 (Step S100) and sets a torque command Tm2* of the motor MG2 by calculation of below Equation (2) based on the torque command Tm1*, the gear ratio ρ (a quotient of the number of teeth of the sun gear 31 by the number of teeth of the ring gear 32) of the power distribution integration mechanism 30, and the gear ratio Gr of the reduction gear 35 (Step S230). Equation (1) is a relational expression of feedback control for motoring the engine 22 in a fuel cut state by the motor MG1 to match the rotational speed Ne to the target rotational speed Ne*. In Equation (1) given above, 'k10' in the first term and 'k20' in the second term on the right side respectively denote a gain of the proportional and a gain of the integral term. Equation (2) is a relational expression to cancel torque acting on the ring gear shaft 32a through the motoring of the engine 22 by the motor MG1 and to hold the rotational speed of the ring gear shaft 32a at value "0" (to maintain the stop of the hybrid vehicle 20).

$$Tm1^* = k10 \cdot (Ne^* - Ne) + k20 \cdot \int (Ne^* - Ne) dt \quad (1)$$

$$Tm2^* = Tm1^*/\rho/Gr \quad (2)$$

After setting the torque commands Tm1* and Tm2* of the motors MG1 and MG2, the CPU 72 sends a fuel cut command for stopping the fuel injection with respect to the engine 22 to the engine ECU 24 and sends the torque commands Tm1* and Tm2* of the motors MG1 and MG2 to the motor ECU 40 (Step S240). Then, the CPU 72 returns to Step S100 to repeat the processes of and after Step S100. The motor ECU 40 receives the torque commands Tm1* and Tm2* and performs switching control of switching elements included in the respective inverters 41 and 42 so that the motor MG1 is driven in accordance with the torque command Tm1* and the motor MG2 is driven in accordance with the torque command Tm2*. Thus, the engine 22, the motors MG1 and MG2 are controlled so that torque for driving the vehicle is not output to the ring gear shaft 32a and the rotational speed Ne of the engine 22 becomes the target rotational speed Ne* corresponding to the accelerator opening Acc when the accelerator opening Acc is equal to or more than the threshold value A1 by a depression of the accelerator pedal 83 by the driver after the engine 22 is started through the engine start process at Step S190 while the shift position SP is set to the N position. On the other hand, when determined that the accelerator opening Acc is less than the threshold value A1 at Step S210, the CPU 72 sends an autonomous operation command for autonomously operating the engine 22 to the engine ECU 24 (Step S250) and returns to Step S100 to repeat the processes of and after Step S100. Thus, in the hybrid vehicle 20 of the embodiment, the engine 22 is autonomously operated not to output torque when the accelerator opening Acc is less than the threshold value A1 (the accelerator pedal 83 is not substantially depressed by the driver) after the engine 22 is started through the engine start process at Step S190 while the shift position SP is set to the N position.

When determined that the charge flag Fchg is value "1" at Step S120 and the battery 50 is to be forcefully charged while the N position control routine of FIG. 2 is executed, a predetermined battery charge process (Step S260) is executed. The battery charge process sets the torque command of the motor MG1 so as to generate electric power through the use of whole power from the engine 22 and sets the torque command of the motor MG2 to cancel torque acting on the ring gear shaft 32a through a power generation by the motor MG1 and to maintain the stop of the hybrid vehicle 20 after the engine 22 is started through a similar process to the engine start process at Step S190). The N position control of FIG. 2 is terminated when determined that the shift position SP is the drive position other than the N position (for example, D position) at Step S110, then processes for the drive position such as the D position is executed.

As has been described above, in the hybrid vehicle 20 of the embodiment, the engine 22, the motors MG1 and MG2 are controlled so that the engine 22 is started through the cranking (motoring) by the motor MG1 (Steps S150-S190) when the accelerator opening Acc by the driver becomes equal to or more than the threshold value A0 while the shift position SP is set to the N position and the operation of the engine 22 is stopped. Thus, in the hybrid vehicle 20, the start of the engine 22 may notify the driver that the accelerator operation is made while the shift position SP is set to the N position, thereby providing the driver with operational feeling same as conventional vehicles having only the internal combustion engine as the drive source. Accordingly, in the embodiment, the hybrid vehicle 20 can be appropriately controlled in response to the accelerator operation by the driver when the shift position SP is set to the N position.

In the hybrid vehicle 20 of the embodiment, the engine 22, the motors MG1 and MG2 are controlled so that the rotational speed Ne becomes the target rotational speed Ne* corresponding to the acquired accelerator opening Acc (Steps S220-S240) when the accelerator opening Acc by the driver is equal to or more than the threshold value A1 after the engine 22 is started while the shift position SP is set to the N position and the operation of the engine 22 is stopped. Further, when the accelerator opening Acc by the driver is less than the threshold value A1 after the start of the engine 22, the engine 22 is controlled to autonomously operate (Step S250). Thus, it is possible to appropriately operate the engine 22 after the start of the engine 22 while the shift position is set to the N position and to adequately notify the driver that the accelerator operation is made while the shift position SP is set to the N position.

Further, in the hybrid vehicle 20 of the embodiment, the engine 22 is not started and the warning message such as "Accelerator pedal is depressed while setting "N" position." is displayed on the display (Step S200) when the engine start prohibition flag Fsd is value "1" (engine start prohibition condition is satisfied) and the accelerator opening Acc is equal to or more than the threshold value A0 while the shift position SP is set to the N position and the operation of the engine 22 is stopped. Thus, it is possible to notify the driver that the accelerator operation is made while the shift position SP is set to the N position even if the start of the engine 22 is prohibited when the accelerator opening Acc becomes equal to or more than the threshold value A0 while the shift position SP is set to the N position and the operation of the engine 22 is stopped.

Figure 3:
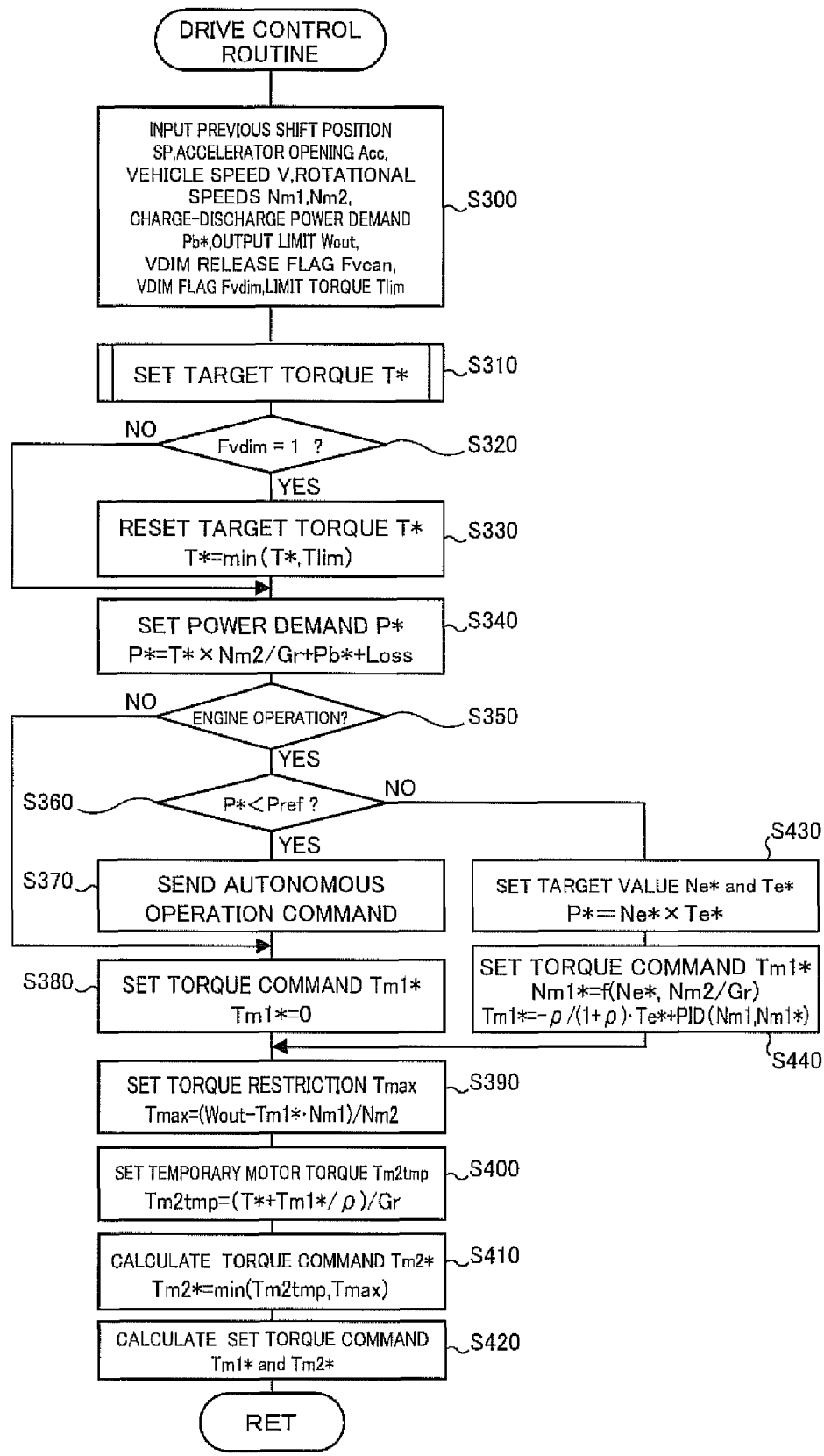
FIG. 3 is a flowchart illustrating an example of a drive control routine executed by the hybrid electric control unit 70.

Next, an operation of the hybrid vehicle 20 when the shift position SP is changed from the N position to the D position (drive position) will be described. FIG. 3 is a flowchart illustrating an example of a drive control routine that is executed by the hybrid ECU 70 at predetermined time intervals (for example, at every several msec) when the shift position SP is set to the D position.

At start of the drive control routine of FIG. 3, the CPU 72 of the hybrid ECU 70 executes an input process of data required for the control such as a previous shift position SP, the accelerator opening Acc from the accelerator pedal position sensor 84, the vehicle speed V from the vehicle speed sensor 87, the rotational speeds Nm1, Nm2 of the motors MG1, MG2 from the motor ECU 40, the charge-discharge power demand Pb* and the output limit Wout of the battery 50, a value of the VDIM release flag Fvcan, a value of the VDIM flag Fvdim, and the limit torque Tlim from the brake ECU 95, and the like (Step S300). The previous shift position SP is the shift position SP set before an execution of Step S300 and stored in a predetermined storage area. The charge-discharge power demand Pb* and the output limit Wout is input the battery ECU 52 by communication.

Figure 4:
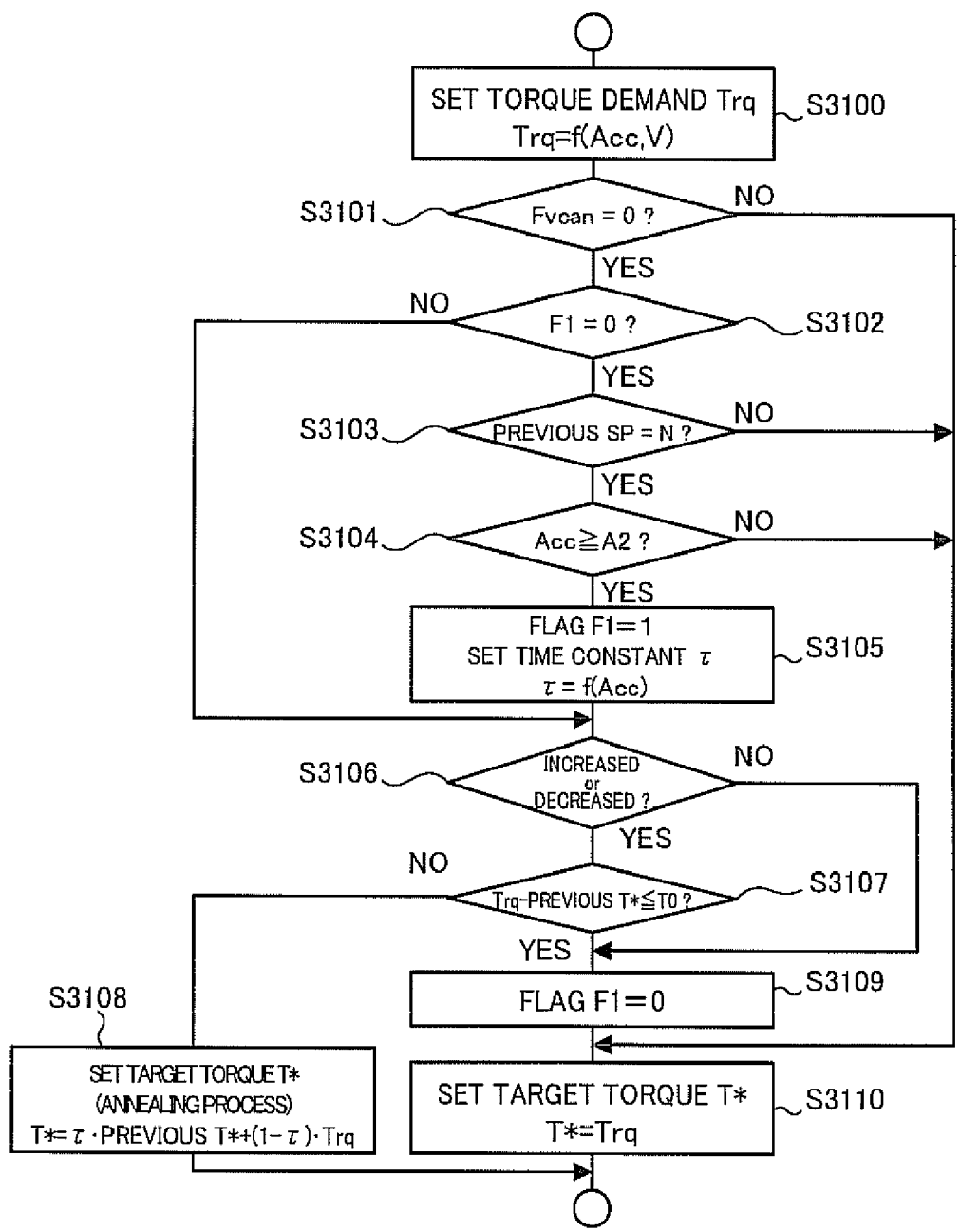
FIG. 4 is a view illustrating an example of a setting process of a target torque T*.
Figure 5:
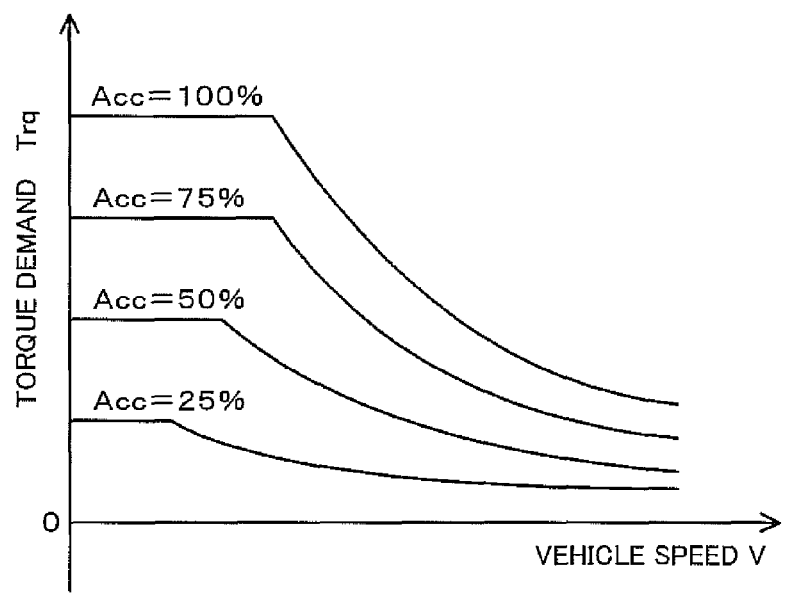
FIG. 5 is a view illustrating an example of a torque demand setting map.

After the data input at Step S300, the CPU 72 sets a target torque T* that is a target value of torque to be output to the ring gear shaft 32a based on the accelerator opening Acc by the driver, the vehicle speed V, and the like (Step S310). FIG. 4 illustrates an example of a setting process of a target torque T* at Step S310. As shown in FIG. 4, in order to set the target torque T*, the CPU 72 sets a torque demand Trq required for driving the vehicle based on the input accelerator opening Acc and the input vehicle speed V (Step S3100). In the embodiment, the torque demand Trq corresponding to the given accelerator opening Acc and the given vehicle speed V is derived from a torque demand setting map previously stored in the ROM 74 and defining a relationship between the accelerator opening Acc, the vehicle speed V and the torque demand Trq. FIG. 5 illustrates an example of the torque demand setting map. Then, the CPU 72 determines whether or not the VDIM release flag Fvcan is value "0", that is, whether or not the Vehicle Dynamics Integrated Management is released with the VDIM release switch 88 (Step S3101). When the VDIM release flag Fvcan is value "0" and the Vehicle Dynamics Integrated Management is not released, the CPU 72 determines whether or not a flag F1 is value "0" (Step S3102). When the flag F1 is value "0", the CPU 72 determines whether or not the previous shift position SP input at Step S300 is the N position (Steps S3103). When the input previous shift position SP is not the N position but the D position (normal state), the CPU 72 sets the target torque T* to the torque demand Trq set at Step S3100 (Step S3110). When determined the previous shift position SP is the N position at Step S3103, for example when the drive control routine is started in response to a shift change from the N position to the D position by the driver during the stop of the hybrid vehicle 20, the CPU 72 determines whether or not the accelerator opening Acc input at Step S300 (accelerator opening Acc upon the shift change from the N position to the D position) is equal to or more than a predetermined threshold value A2 (Step S3104). In the embodiment, the threshold value A2 is set to a relatively large positive value (for example, 50-60%). When the accelerator opening Acc upon the shift change from the N position to the D position is less than the threshold value A2, the CPU 72 sets the target torque T* to the torque demand Trq set at Step S3100 (Step S3110)

On the other hand, the CPU 72 sets the flag F1 to value "1" and sets a time constant τ based on the accelerator opening Acc input at Step S300, that is, the accelerator opening Acc upon the shift change from the N position to the D position (Step S3105) when determined that the accelerator opening Acc is equal to or more than the threshold value A2 (Step S3104), that is, when determined that the accelerator pedal 83 is relatively strongly depressed by the driver upon the shift change from the N position to the D position. The time constant τ is a value within a range from "0" to "1". In the embodiment, the time constant T corresponding to the given accelerator opening Acc is derived from a time constant setting map (not shown) previously stored in the ROM 74 and defining a relationship between the accelerator opening Acc and the time constant τ upon the shift change from the N position to the D position. Then, the CPU 72 compares a difference between the accelerator opening Acc input at Step S300 and a previous accelerator opening Acc with an upper side and lower side threshold value for example, determines whether the accelerator opening Acc or the operation amount of the accelerator pedal 83 is relatively (considerably) increased or decreased by the driver (Step S3106). When the accelerator opening Acc is not relatively increased or decreased, the CPU 72 determines whether or not a torque difference is equal to or less than a predetermined threshold value T0 (Step S3107). The torque difference is obtained by subtracting a previous target torque T* (T*=0 at an initial execution of the routine) from the torque demand Trq set at Step S3100. When the torque difference is more than the threshold value T0, the CPU 72 sets the target torque T* through an annealing based on the torque demand Trq set at Step S3100, the previous target toque T* and the time constant τ set at Step S3105 according to below Equation (3) (Step S3108). Thus, in the hybrid vehicle 20, when the accelerator opening Acc is not relatively increased or decreased (changed) and the difference between the torque demand Trq and the previous target torque T* is relatively large, the target torque T* is set to gradually change in comparison with that of the normal state in which the target torque T* is set at Step S3110 even if the accelerator pedal 83 is deeply depressed by the driver upon the shift change from the N position to the D position.

$$T^* = \tau \cdot \text{previous } T^* + (1-\tau) \cdot Trq \qquad (3)$$

When the flag F1 is set to Value "1" in response to a determination that the accelerator pedal 83 is deeply depressed by the driver upon the shift change from the N position to the D position (Step S3105), a negative determination is made at Step S3102 after a next execution of the drive control routine of FIG. 3. In this case, the processes of Steps S3103-S3105 is skipped and the processes of and after Step S3106 is executed. When determined that the accelerator opening Acc is relatively increased or decreased by the driver at Step S3106 after the setting of the target torque T* through the annealing at Step S3108 is started, the CPU 72 sets the flag F1 to value "0" (Step S3109) and sets the target torque T* to the torque demand Trq set at Step S3100 (Step S3110). When the torque difference obtained by subtracting the previous target torque T* from the torque demand Trq becomes equal to or less than the threshold value T0 after a start of the setting target torque T* through the annealing of Step S3108 (Step S3107), the CPU 72 sets the flag F1 to "value 0" (Step S3109) and sets the target torque to the torque demand Trq set at Step S3100 (Step S3110). Further, when determined that the VDIM release flag Fvcan is value "1" and the Vehicle Dynamics Integrated Management is released at Step S3101, the CPU 72 sets the target torque T* to the torque demand Trq set at Step S3100 (Step S3110). That is, when the Vehicle Dynamics Integrated Management is released by the driver, the torque demand Trq set at Step S3100 is set as the target torque T* even if the accelerator pedal 83 is deeply depressed upon the shift change from the N position to the D position.

After setting the target torque T* as described above, as shown in FIG. 3, the CPU 72 determines whether or not the VDIM flag Fvdim is value "1" (Step S320). When the VDIM flag Fvdim is value "1", the limit torque Tlim set by the brake ECU 95 has been input at Step S300. Accordingly, in this case, the CPU 72 resets the target torque T* to smaller one of the target torque T* set at Step S310 and the limit torque Tlim (Step S330). The process at Step S330 is skipped when determined the VDIM flag Fvdim is value "0" at Step S320. Then, the CPU 72 sets a power demand P* required for whole of the vehicle (Step S340). In the embodiment, the power demand P* is calculated as the sum of a product of the set target torque T* and a rotational speed Nr of the ring gear shaft 32a, the charge-discharge power demand Pb* (where positive values represent discharge demands), and a potential loss Loss. The rotational speed Nr of the ring gear shaft 32a is obtained by dividing the rotational speed Nm2 of the motor MG2 by a gear ratio Gr of the reduction gear 35 or by multiplying the vehicle speed V by a predetermined conversion factor k. After setting the power demand P*, the CPU 72 determines whether or not the engine 22 is operated (Step S350). When the engine 22 is operated, for example, when the engine is started due to the accelerator operation while the shift position SP is set to the N position, the CPU 72 determines whether or not the power demand P* set at Step S340 is less than a predetermined threshold value Pref (Step S360). When determined that the power demand P* is less than the threshold value Pref at Step S360, the CPU 72 sends an autonomous operation command for autonomously operating the engine 22 at a predetermined autonomous rotational speed so as not to output torque to the engine ECU 24 (Step S370) and sets the torque command Tm1* of the motor MG1 to value "0" (Step S380).

Figure 6:
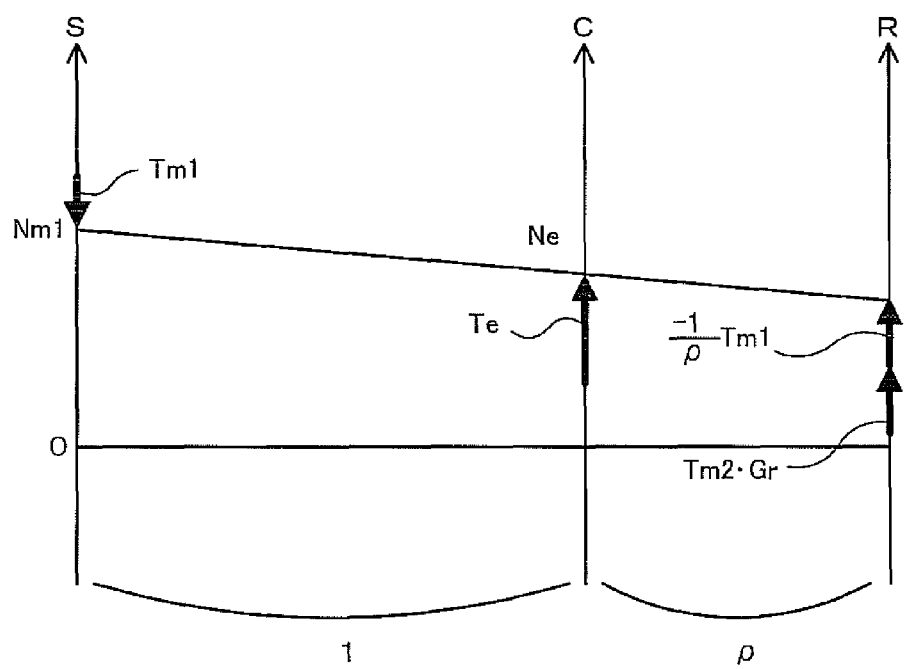
FIG. 6 is a view illustrating an alignment chart showing a dynamic relationship between a rotational speed and torque of each rotating element of a power distribution and integration mechanism 30.

Then, the CPU 72 calculates a torque restriction Tmax as allowable maximum torques to be output from the motor MG2 according to following equation (4) by dividing a deviation between the output limit Wout of the battery 50 and power consumption of the motor MG1 that is a product of the torque command Tm1* and the current rotational speed Nm1 of the motor MG1 by the rotational speed Nm2 of the motor MG2 (Step S390). Further, the CPU 72 calculates a temporary motor torque Tm2*tmp* as a torque value to be output from the motor MG2, based on the target torque T*, the torque command Tm1*, the gear ratio ρ of the power distribution integration mechanism 30, and the gear ratio Gr of the reduction gear 35 according to Equation (5) given below (Step S400). Then, the CPU 72 sets a torque command Tm2* of the motor MG2 to a value obtained by limiting the calculated temporary motor torque Tm2*tmp* by the upper torque restrictions Tmax calculated at Step S390 (Step S410). Setting the torque command Tm2* of the motor MG2 in this manner restricts the torque to be output to the ring gear shaft 32*a* in the range of the output limit Wout of the battery 50. After setting the torque commands Tm1* and Tm2* of the motors MG1 and MG2, the CPU 72 sends the torque commands Tm1* and Tm2* to the motor ECU 40 (Step S420) and returns to Step S300 to repeat the processes of and after Step S300. The motor ECU 40 receives the torque commands Tm1* and Tm2* and performs switching control of switching elements included in the respective inverters 41 and 42 so that the motor MG1 is driven in accordance with the torque command Tm1* and the motor MG2 is driven in accordance with the torque command Tm2*. Equation (5) is readily introduced from an alignment chart of FIG. 6 illustrating torque-rotational speed dynamics of the respective rotational elements included in the power distribution integration mechanism 30. In FIG. 6, the left axis 'S' represents a rotational speed of the sun gear 31 that is equivalent to the rotational speed Nm1 of the motor MG1, the middle axis 'C' represents a rotational speed of the carrier 34 that is equivalent to the rotational speed Ne of the engine 22, and the right axis 'R' represents the rotational speed Nr of the ring gear 32 obtained by dividing the rotational speed Nm2 of the motor MG2 by the gear ratio Gr of the reduction gear 35. Two thick arrows on the axis 'R' respectively show torque applied to the ring gear shaft 32*a* by output of the torque Tm1 from the motor MG1, and torque applied to the ring gear shaft 32*a* via the reduction gear 35 by output of the torque Tm2 from the motor MG2.

$$Tmax=(Wout-Tm1^*Nm1)/Nm2 \tag{4}$$

$$Tm2tmp=(T^*+Tm1^*/\rho)/Gr \tag{5}$$

Figure 7:
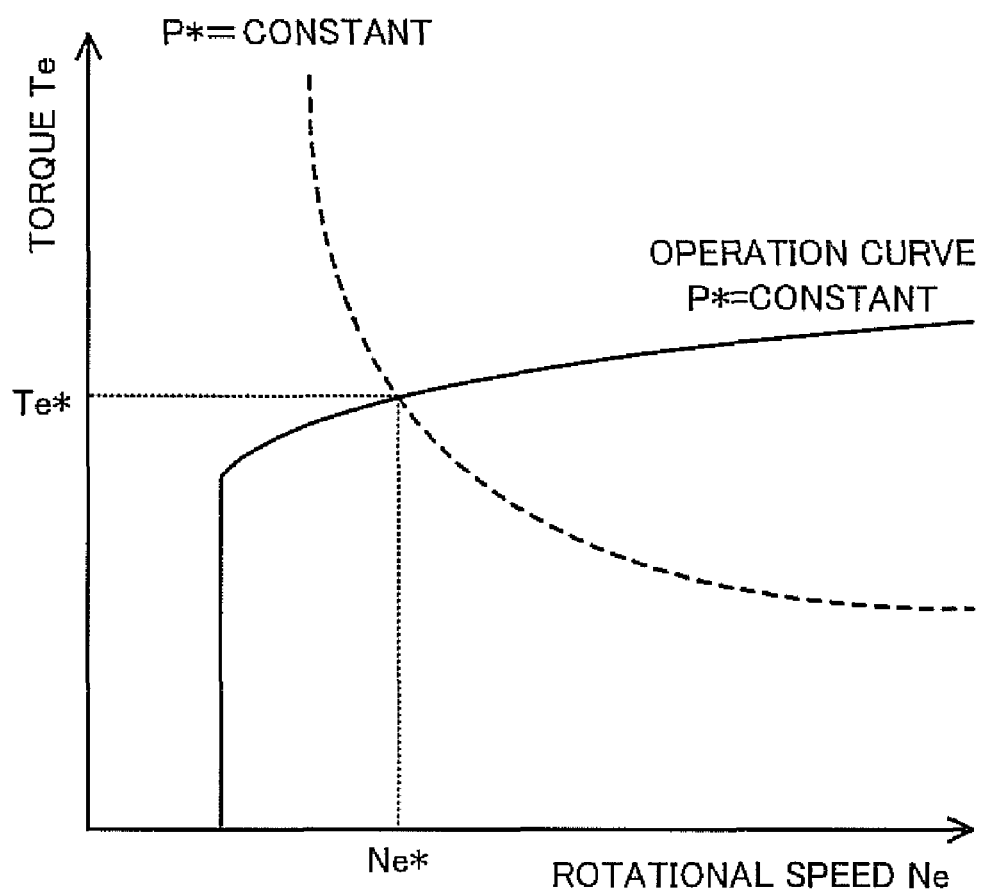
FIG. 7 is a view illustrating an operation curve of an engine 22 and a correlation curve between a target rotational speed Ne* and a target torque Te*.

When determined that the power demand P* is equal to or more than the threshold value Pref, the CPU 72 sets the target rotational speed Ne* and the target torque Te* of the engine 22 based on the power demand P* so that the engine 22 outputs the power demand P* and sends the set target rotational speed Ne* and target torque Te* to the engine ECU 24 (Step S430). In the embodiment, the target rotational speed Ne* and the target torque Te* of the engine 22 are set based on a predetermined operation curve for operating the engine 22 with high efficiency and the power demand P*. FIG. 7 illustrates the operation curve of the engine 22 and a correlation curve between the target rotational speed Ne* and the target torque Te*. As shown in FIG. 7, the target rotational speed Ne* and the target torque Te* can be obtained from an intersection between the operation curve and the correlation curve indicating a constant power demand P* (Ne*×Te*). After setting the target rotational speed Ne* and the target torque Te* of the engine 22, the CPU 72 calculates a target rotational speed Nm1* of the motor MG1 from the target rotational speed Ne* set at Step S430, the rotational speed Nr (=Nm2/Gr) of the ring gear shaft 32*a*, and a gear ratio ρ of the power distribution integration mechanism 30 according to Equation (6) given below. Then, CPU 72 computes the torque command Tm1* of the motor MG1 by calculation of below Equation (7) based on the calculated target rotational speed Nm1* and the current rotational speed Nm1 of the motor MG1 (Step S440). Equation (6) for the calculation of the target rotational speed Nm1* of the motor MG1 is readily obtained by taking into account the rotational speed relation in the alignment chart of FIG. 6. Equation (7) is a relational expression of feedback control to drive and rotate the motor MG1 at the target rotational speed Nm1*. In Equation (7) given below, 'k1' in the second term and 'k2' in the third term on the right side respectively denote a gain of the proportional and a gain of the integral term. After calculating the torque command Tm1* of the motor MG1, the CPU 72 executes the processes of Steps S390-S420 described above, and returns to Step S300 to repeat the processes of and after Step S300. On the other hand, when determined that the operation of the engine 22 is stopped at Step S350, the CPU 72 sets the torque command Tm1* of the motor MG1 to value "0" (Step S380) and executes the processes of Steps S390-S420 described above. Then, the CPU 72 returns to Step S300 to repeat the processes of and after Step S300.

$$Nm1^*=Ne^*\cdot(1+\rho)/\rho-Nm2/(Gr\cdot\rho) \tag{6}$$

$$Tm1^*=-\rho/(1+\rho)\cdot Te^*+k1\cdot(Nm1^*-Nm1)+k2\sim\!\int(Nm1^*-Nm1)dt \tag{7}$$

As has been described above, in the hybrid vehicle 20 of the embodiment, The target torque T* (target driving force) to be output to the ring gear shaft 32*a* is set based on the accelerator opening Acc when the accelerator opening Acc by the driver is less than the threshold value A2 (the normal state, that is, non-satisfaction of the predetermined condition) upon the shift change from the N position to the D position (Step S310 in FIG. 3 and Steps S3100 and S3110 in FIG. 4). Then, the engine 22, the motors MG1 and MG2 are controlled so as to ensure torque for driving the vehicle 20 equivalent to the set target torque T* (Steps S320-S440 in FIG. 3). When the accelerator opening Acc by the driver is equal to or more than the threshold value A2 (satisfaction of the predetermined condition) upon the shift change from the N position to the D position, the target torque T* is set so as to gradually change in comparison with that of the normal state based on the torque demand Trq corresponding to the accelerator opening Acc, the time constant τ as a gradual change restriction, and the above Equation (3) until a satisfaction of a release condition of Steps S3106 and S3107 in FIG. 4 (Step S3108 in FIG. 4). Then, the engine 22, the motors MG1 and MG2 are controlled so as to ensure torque for driving the vehicle 20 equivalent to the set target torque T* (Steps S320-S440 in FIG. 3). Thus, the hybrid vehicle 20 can be smoothly driven without a sudden start (hard acceleration) even if the driver intentionally or accidentally changes the shift position SP from the N position to the D position while depressing the accelerator pedal 83 when the shift position SP is set to the N position. Accordingly, in the embodiment, the hybrid vehicle 20 can be appropriately controlled in response to the accelerator operation and a shift operation by the driver when the shift position SP is set to the N position.

Further, the hybrid vehicle 20 of the embodiment includes the brake ECU 95 that performs the Vehicle Dynamics Integrated Management in the behavior unstable state such as the wheel spin state and outputs the limit torque Tlim to be output to the ring gear shaft 32a in order to reduce the behavior unstable state, and the VDIM release switch 88 that allows the driver to release the Vehicle Dynamics Integrated Management by the brake ECU 95. In the hybrid vehicle 20, the target torque T* is set to the torque demand Trq corresponding to the accelerator opening Acc as well as on the normal state regardless of whether or not the driver's accelerator opening Acc is equal to or more than the threshold value A2 when the Vehicle Dynamics Integrated Management by the brake ECU 95 is released with the VDIM release switch 88 (Steps S3100, S3101 and S3110 in FIG. 4). The driver may accept that the behavior of the hybrid vehicle 20 become unstable in some degree when releasing the Vehicle Dynamics Integrated Management with the VDIM release switch 88. Accordingly, it is possible to relatively suddenly start (accelerate) the hybrid vehicle 20 in accordance with the driver's intention by setting the target torque T* based on the accelerator opening Acc as well as on the normal state when the Vehicle Dynamics Integrated Management is releases by the driver.

Further, in the embodiment, the torque demand Trq for driving the vehicle 20 is set based on the accelerator opening Acc (Step S3100 in FIG. 4) and the target torque T* is set to the torque demand Trq in itself on the normal state (Step S3110 in FIG. 4). When the accelerator opening Acc by the driver is equal to or more than the threshold value A2 (satisfaction of the predetermined condition) upon the shift change from the N position to the D position, the target torque T* is set so as to gradually change in comparison with that of the normal state based on the torque demand Trq corresponding to the accelerator opening Acc, the time constant τ as a gradual change restriction, and the above Equation (3) (Step S3108 in FIG. 4). Thus, the target torque T* is appropriately and gradually changed, so that the behavior of the hybrid vehicle 20 can be stabilized when the shift position SP is changed from the N position to the D position while the accelerator pedal 83 is depressed.

Figure 8:
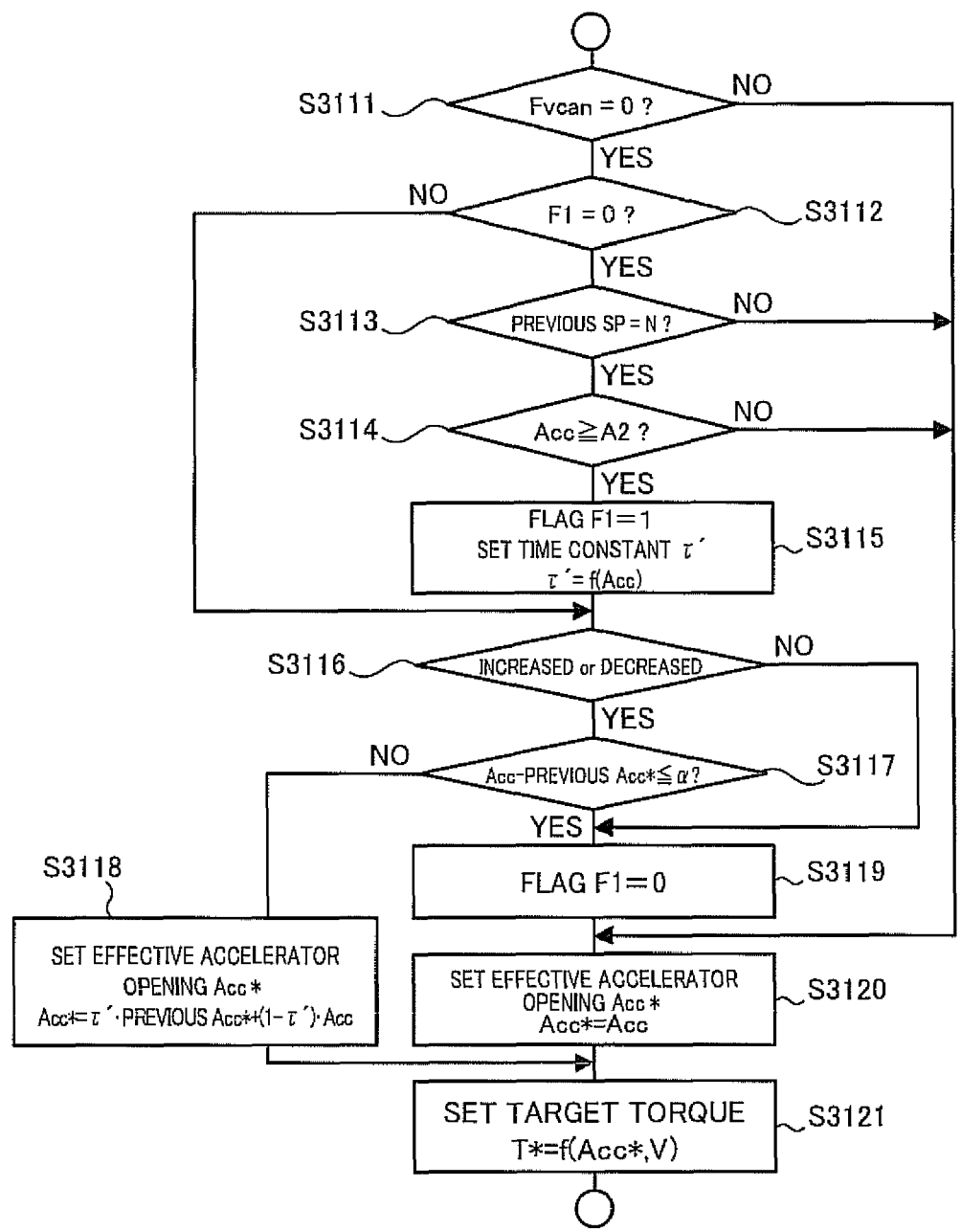
FIG. 8 is a view illustrating another example of a setting process of a target torque T*.

FIG. 8 is a view illustrating another example of the setting process of the target torque T*. Upon an execution of the setting process of the target torque T* in FIG. 8, the CPU 72 of the hybrid ECU 70 executes the same processes as Step S3101-S3104 in FIG. 4 at Steps S3111-S3114. Then, the CPU 72 sets the flag F1 to value "1" and derives a time constant τ' corresponding to the accelerator opening Acc input at Step S300 from a time constant setting map (not shown) defining a relationship between the accelerator opening Acc upon the shift change from the N position to the D position and the time constant τ' (Step S3115) when determining that the accelerator opening Acc is equal to or more than the threshold value A2 at Step S3114 (when determining that the accelerator pedal 83 is relatively depressed upon the shift change from the N position to the D position). Further, the CPU 72 executes the same process as Step S3106 in FIG. 4 (Step S3116) and determines whether or not an accelerator opening difference obtained by subtracting a previous effective acceleration opening Acc* (initial value=0) from the accelerator opening Acc input at Step S300 is equal to or less than a predetermined threshold value α (Step S3117). When the accelerator opening Acc is not relatively increased or decreased and the accelerator opening difference is more than the threshold value α, the CPU 72 sets the effective accelerator opening Acc* so as to gradually change in comparison with that of the normal state based the accelerator opening Acc, the time constant τ' as the gradual change restriction set at Step S3115 and below Equation (8) (Step S3118). On the other hand, the effective accelerator opening Acc* is set to the accelerator opening Acc input at Step S300 in itself (Step S3120) when the normal state in which a negative determination is made at Steps S3113 or S3114, when the accelerator opening Acc is relatively increased or decreased by the driver (Steps S3116, S3119), when the accelerator opening difference becomes equal to or less than the threshold value α (Steps S3117, S3119) and when the Vehicle Dynamics Integrated Management is released by the driver (Step S3111). After setting the effective accelerator opening Acc*, the target torque T* corresponding to the effective accelerator opening Acc* and the vehicle speed V is derived from the same map as the torque demand setting map in FIG. 5 (Step S3121). Then, the engine 22, the motors MG1 and MG2 are controlled so as to ensure torque for driving the vehicle 20 equivalent to the set target torque T*. By setting the effective accelerator opening Acc* so as to gradually change in comparison with that of the normal state based on the driver's accelerator opening Acc, the time constant τ' as the gradual change restriction, and the Equation (8) and setting the target torque T* based on the effective accelerator opening Acc*, the target torque T* can be appropriately and gradually changed. In this case, the release condition of the gradual change process for the target torque T* is preferably satisfied when the difference between the accelerator opening Acc input at Step S300 equivalent to the effective accelerator opening Acc* set as well as on the normal state and the like and the previous effective accelerator opening Acc* acceptably becomes small (Step S3117).

$$Acc^* = \tau' \cdot \text{previous } Acc^* + (1-\tau') \cdot Acc \qquad (8)$$

Figure 9:
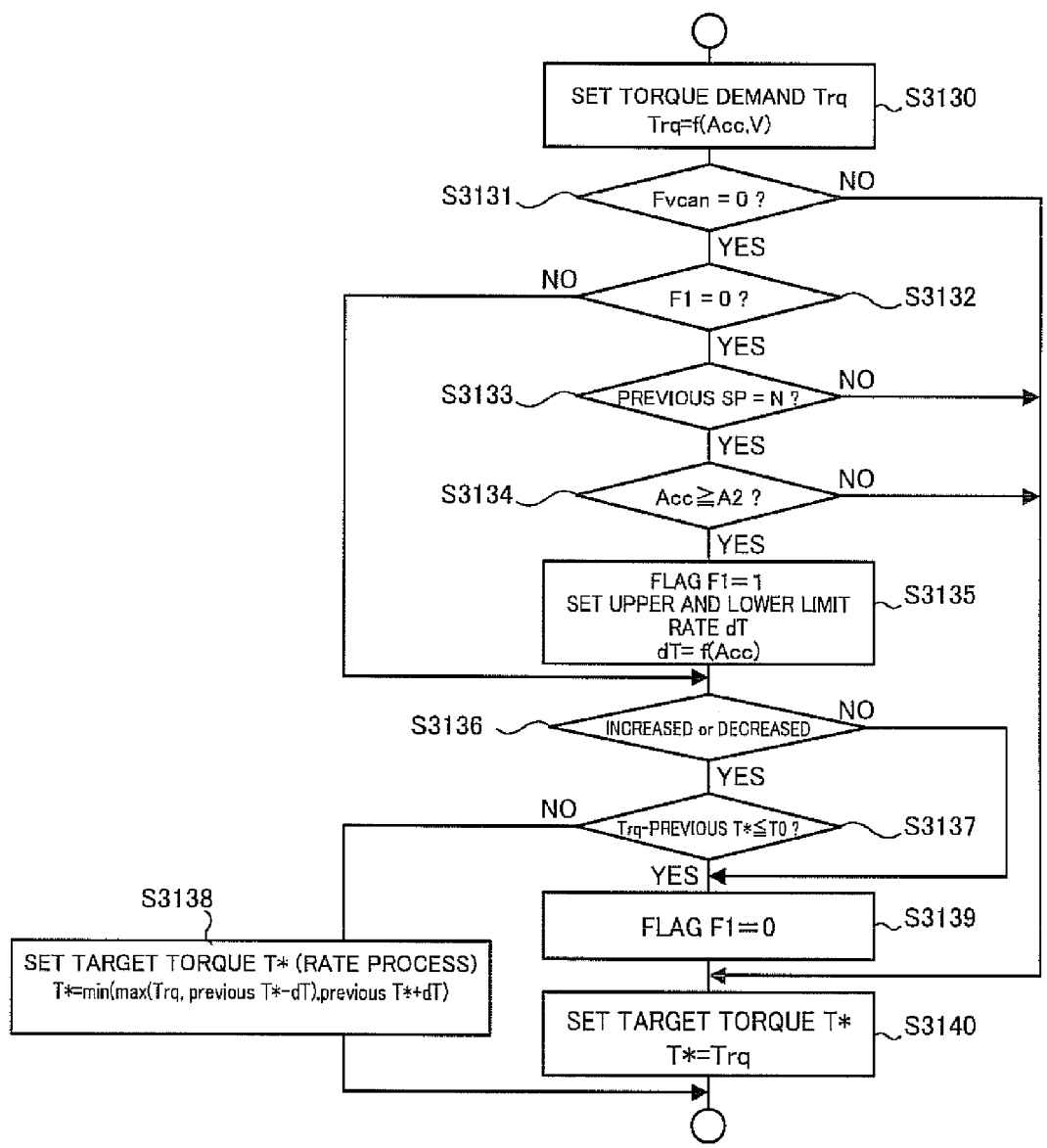
FIG. 9 is a view illustrating still another example of a setting process of a target torque T*.
Figure 10:
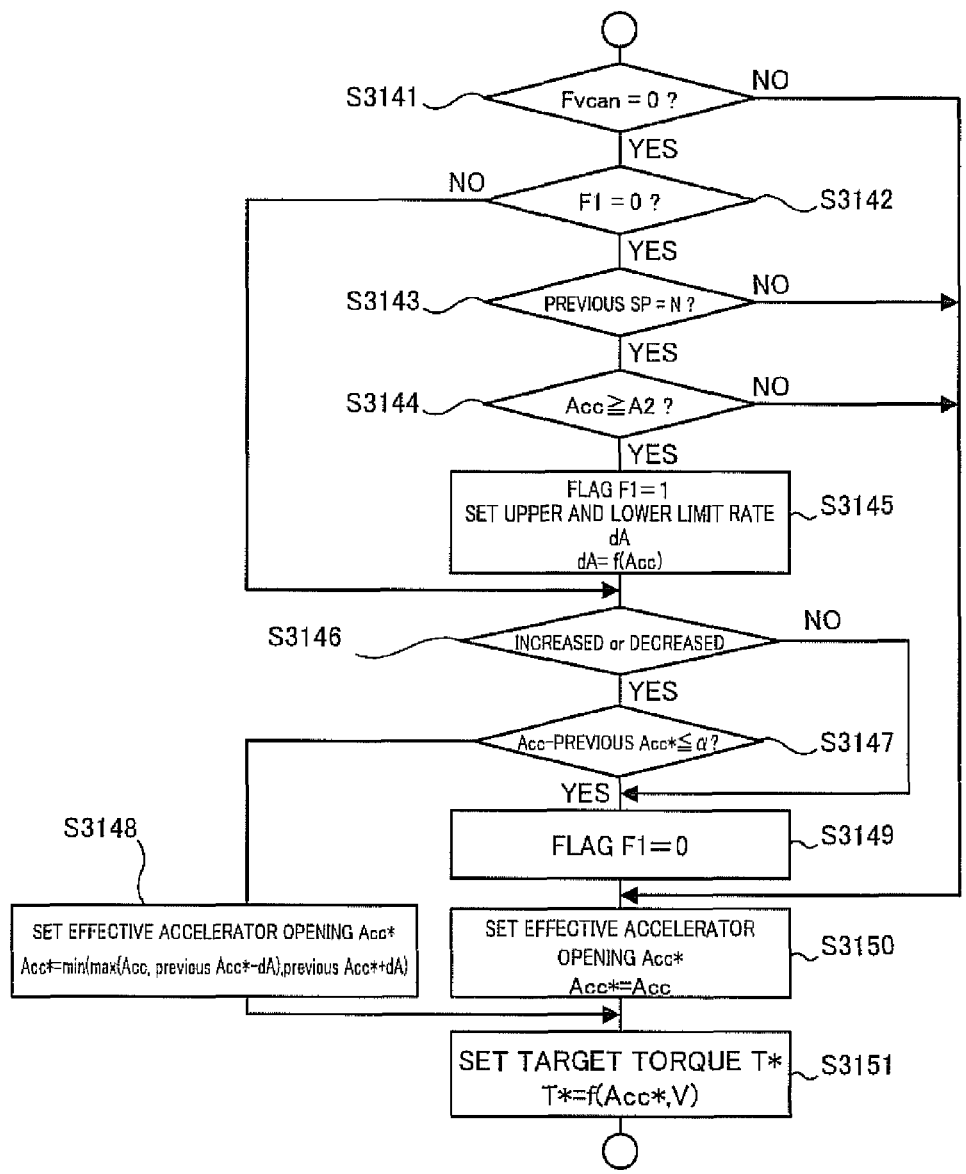
FIG. 10 is a view illustrating another example of a setting process of a target torque T*.

As shown in FIGS. 9 and 10, the target torque T* or the effective accelerator opening Acc* may be set so as to gradual change through a rate process based on an upper and lower limits rate dT or dA that is an allowable change amount in an increase and decrease sides of the target torque T* or the effective accelerator opening Acc* in stead of the annealing process based on the time constant τ or τ'. Upon an execution of the setting process of the target torque T* in FIG. 9, the CPU 72 of the hybrid ECU 70 executes the same processes as Step S3100-S3104 in FIG. 4 at Steps S3130-S3134. Then, the CPU 72 sets the flag F1 to value "1" and derives the upper and lower limit rate dT corresponding to the accelerator opening Acc input at Step S300 from an upper and lower limit rate setting map (not shown) defining a relationship between the accelerator opening Acc upon the shift change from the N position to the D position and the upper and lower limit rate dT (Step S3135) when determining that the accelerator opening Acc is equal to or more than the threshold value A2 at Step S3134 (when determining that the accelerator pedal 83 is relatively depressed by the driver upon the shift change from the N position to the D position). Further, the CPU 72 executes the same process as Step S3106 and S3107 in FIG. 4 at Steps S3136 and S3137. When the accelerator opening Acc is not relatively increased or decreased (changed) and the torque difference obtained by subtracting the previous target torque T* from the torque demand Trq is more than the threshold value T0, the CPU 72 sets the target torque T* through the rate process according to below Equation (9) based on the torque demand Trq set at Step S3130, the previous target torque T*, and the upper and lower limit rate dT set at Step S3135 (Step S3138). On the other hand, target torque T* is set to the torque demand Trq set at Step S3130 in itself (Step S3140) when the normal state in which a negative determination is made at Steps S3133 or S3134, when the accelerator opening Acc is relatively increased or decreased by the driver (Steps S3136, S3139), when the torque difference becomes equal to or less than the threshold value T0 (Steps S3137, S3139) and when the Vehicle Dynamics Integrated Management is released by the driver (Step S3131). By setting the target torque T* so as to gradually change in comparison with that of the normal state based on the torque demand Trq, the upper and lower limit rate dT as the gradual change restriction, and the Equation (9), the target torque T* can be appropriately and gradually changed, so that the behavior of the hybrid vehicle 20 can be stabilized when the shift position SP is changed from the N position to the D position while the accelerator pedal 83 is depressed.

$$T^*=\min(\max(Trq, \text{previous } T^*-dT), \text{previous } T^*+dT) \quad (9)$$

On the other hand, upon an execution of the setting process of the target torque T* in FIG. 10, the CPU 72 of the hybrid ECU 70 executes the same processes as Step S3111-S3114 in FIG. 8 at Steps S3141-S3144. Then, the CPU 72 sets the flag F1 to value "1" and derives an upper and lower limit rate dA corresponding to the accelerator opening Acc input at Step S300 from an upper and lower limit rate setting map (not shown) defining a relationship between the accelerator opening Acc upon the shift change from the N position to the D position and the upper and lower limit rate dA (Step S3145) when determining that the accelerator opening Acc is equal to or more than the threshold value A2 at Step S3144 (when determining that the accelerator pedal 83 is relatively depressed by the driver upon the shift change from the N position to the D position). Further, the CPU 72 executes the same processes as Step S3116 and S3117 in FIG. 8 at Steps S3146 and S3147. When the accelerator opening Acc is not relatively increased or decreased and the accelerator opening difference obtained by subtracting a previous effective acceleration opening Acc* from the accelerator opening Acc is more than the threshold value α, the CPU 72 sets the effective accelerator opening Acc* through the rate process according to below Equation (10) based on the accelerator opening Acc input at Step S300, the previous effective accelerator opening Acc*, and the upper and lower limit rate dA set at Step S3145 (Step S3148). On the other hand, the effective accelerator opening Acc* is set to the accelerator opening Acc input at Step S300 in itself (Step S3150) when the normal state in which a negative determination is made at Steps S3143 or S31344, when the accelerator opening Acc is relatively increased or decreased by the driver (Steps S3146, S3149), when the accelerator opening difference becomes equal to or less than the threshold value α (Steps S3147, S3149) and when the Vehicle Dynamics Integrated Management is released by the driver (Step S3141). After setting the effective accelerator opening Acc* at Step S3148 or S3150, the target torque T* corresponding to the effective accelerator opening Acc* and the vehicle speed V is derived from the same map as the torque demand setting map in FIG. 5 (Step S3151). By setting the effective accelerator opening Acc* so as to gradually change in comparison with that of the normal state based on the accelerator opening Acc, the upper and lower limit rate dA as the gradual change restriction, and the Equation (10), the target torque T* can be appropriately and gradually changed, so that the behavior of the hybrid vehicle 20 can be stabilized when the shift position SP is changed from the N position to the D position while the accelerator pedal 83 is depressed.

$$Acc^*=\min(\max(Acc, \text{previous } Acc^*-dA), \text{previous } Acc^*+dA) \quad (10)$$

Figure 11:
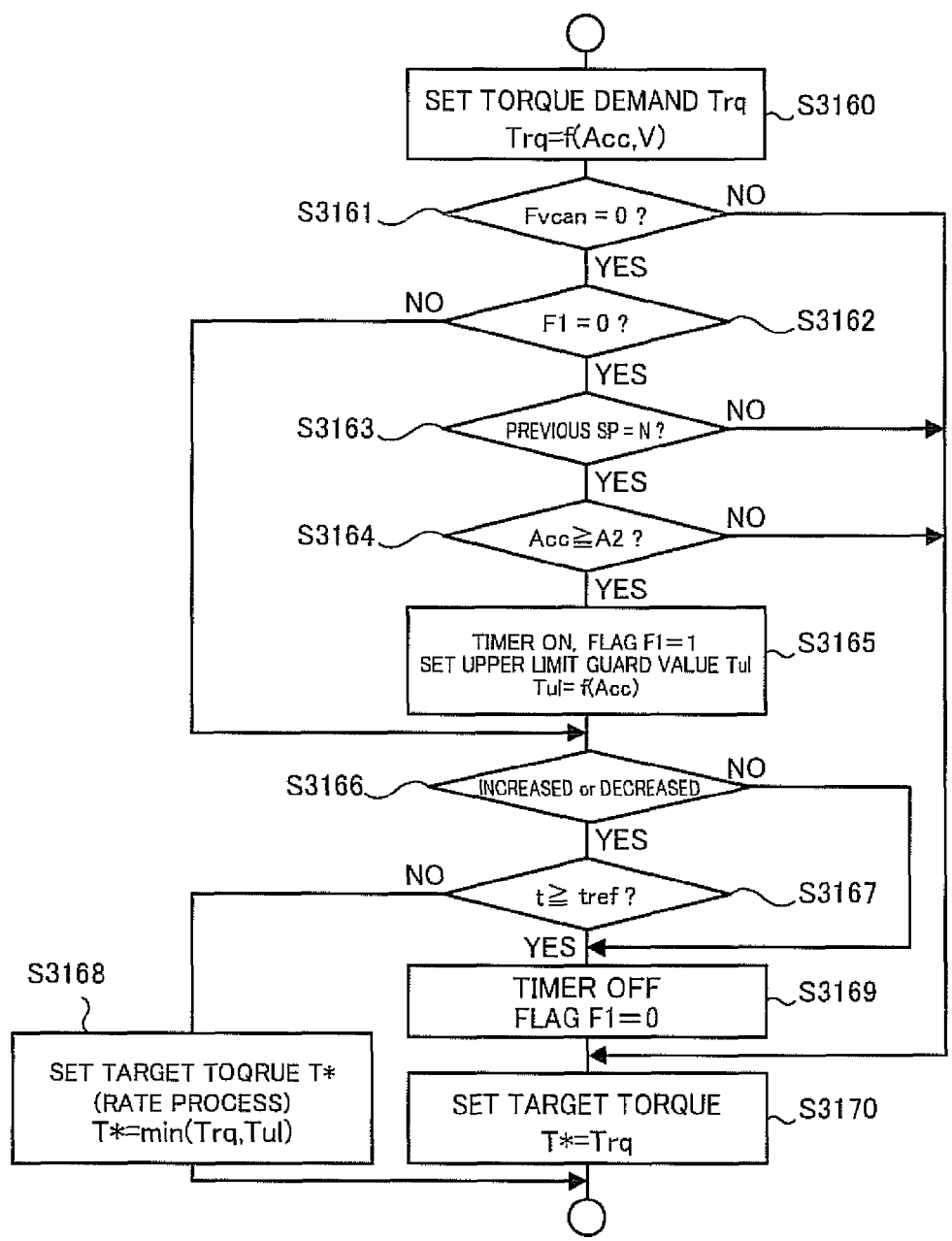
FIG. 11 is a view illustrating still another example of a setting process of a target torque T*.
Figure 12:
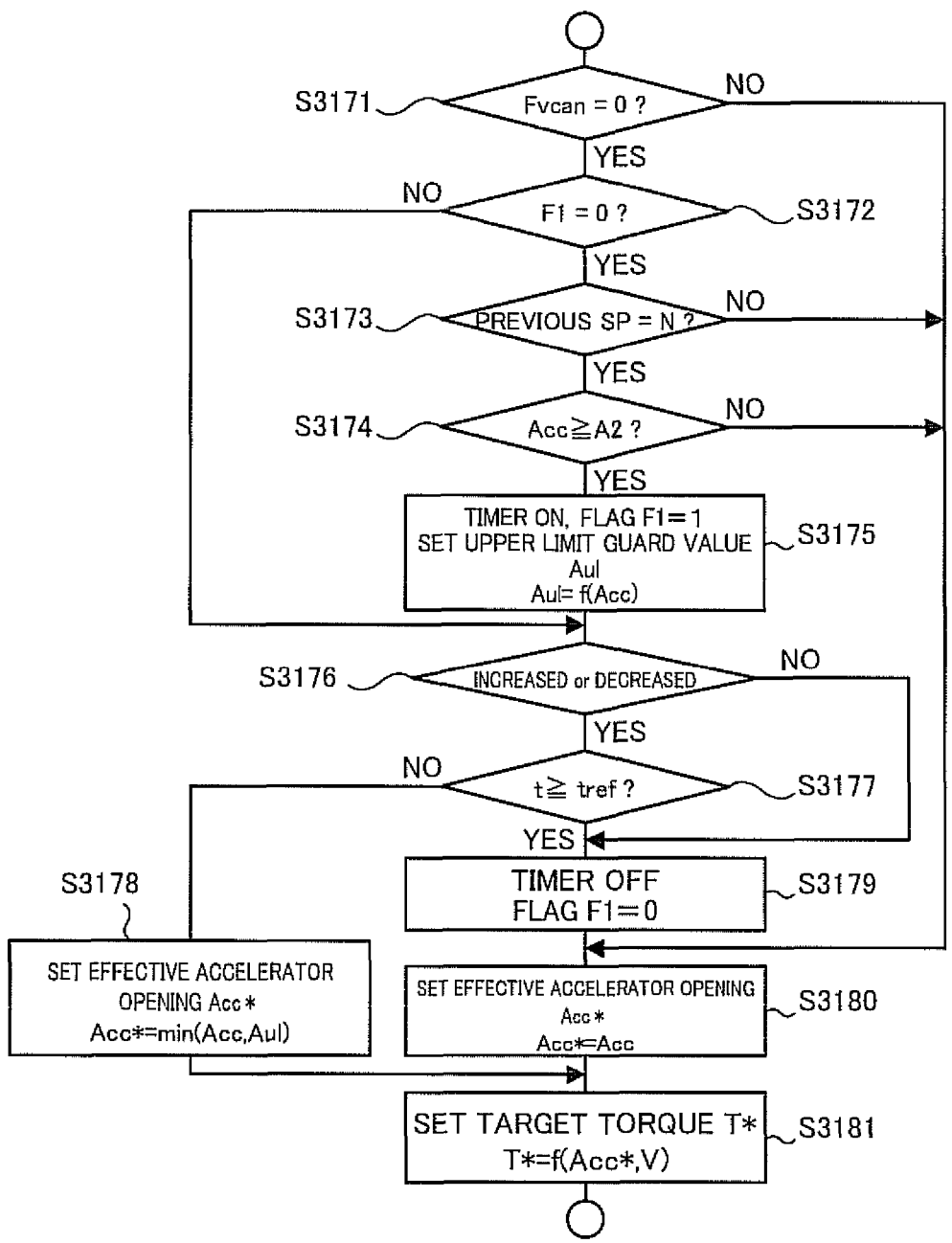
FIG. 12 is a view illustrating another example of a setting process of a target torque T*.

FIG. 11 is a view illustrating still another example of the setting process of the target torque T*. Upon an execution of the setting process of the target torque T* in FIG. 11, the CPU 72 of the hybrid ECU 70 executes the same processes as Step S3100-S3164 in FIG. 4 at Steps S3160-S3164. Then, the CPU 72 sets the flag F1 to value "1", sets the timer 78 on, and derives a upper limit guard value Tul corresponding to the accelerator opening Acc input at Step S300 from an upper limit guard value setting map (not shown) defining a relationship between the accelerator opening Acc upon the shift change from the N position to the D position and the upper limit guard value Tul that is an upper limit value of the target torque T* (Step S3165) when determining that the accelerator opening Acc is equal to or more than the threshold value A2 at Step S3164 (when determining that the accelerator pedal 83 is relatively depressed by the driver upon the shift change from the N position to the D position). Further, the CPU 72 executes the same process as the Step S3106 in FIG. 4 (Step S3166) and determines whether or not counted time t of the timer 78 is equal to or more than a predetermined time tref (Step S3167). When the accelerator opening Acc is not relatively increased or decreased and the counted time t is less than the predetermined time tref, the CPU 72 sets the target torque T* to smaller one of the torque demand Trq set at Step S3160 and the upper limit guard value Tul set at Step S3165 (Step S3168). On the other hand, the target torque T* is set to the torque demand Trq set at Step S3100 in itself (Step S3170) when the normal state in which a negative determination is made at Steps S3163 or S3164, when the accelerator opening Acc is relatively increased or decreased by the driver (Steps S3166, S3169), when the counted time t of the timer 78 is equal to or more than the predetermined time tref (Steps S3167, S3169) and when the Vehicle Dynamics Integrated Management is released by the driver (Step S3161). By limiting the target torque T* based on the upper limit guard value Tul (the upper limit value of the target torque T*) corresponding to the accelerator opening Acc upon the shift change from the N position to the D position, it is possible to reduce the sudden start or the hard acceleration of the hybrid vehicle 20 even if the driver intentionally or accidentally changes the shift position SP from the N position to the D position while depressing the accelerator pedal 83 when the shift position SP is set to the N position. According to the setting process of the target torque T* in FIG. 11, the hybrid vehicle 20 can be appropriately controlled in response to the accelerator operation and the shift operation by the driver when the shift position is set to the N position. In this case, the release condition of the upper limit restriction process is preferably satisfied when the predetermined time tref is elapsed after the start of the upper limit restriction process (Step S3167) as shown in FIG. 11. The target torque T* may be limited based on an upper limit guard value Aul that is an upper limit value of the effective acceleration Acc* as shown in FIG. 12 in stead of the limitation of the target torque T* based on the upper limit guard value Tul that is the upper limit value of the target torque T* as shown in FIG. 11. In the setting process of the target torque T* of FIG. 12, the CPU 72 derives the upper limit guard value Aul corresponding to the accelerator opening Acc input at Step S300 from an upper limit guard value setting map (not shown) defining a relationship between the accelerator opening Acc upon the shift change from the N position to the D position and the upper limit guard value Aul that is an upper limit value of the accelerator opening Acc (Step S3175). When the accelerator opening Acc is not relatively increased or decreased (Step S3176) and the counted time t is less than the predetermined time tref (Step S3177), the CPU 72 sets the effective accelerator opening Acc* to smaller one of the accelerator opening Acc input at Step S300 and the upper limit guard value Aul set at Step S3175 (Step S3178). In FIG. 12, Steps S3171-S3174 and S3179 are the same as Steps S3161-S3164 and S3169 in FIG. 11, and Steps S3180 and S3181 are the same as Steps S3120 and S3121.

Figure 13:
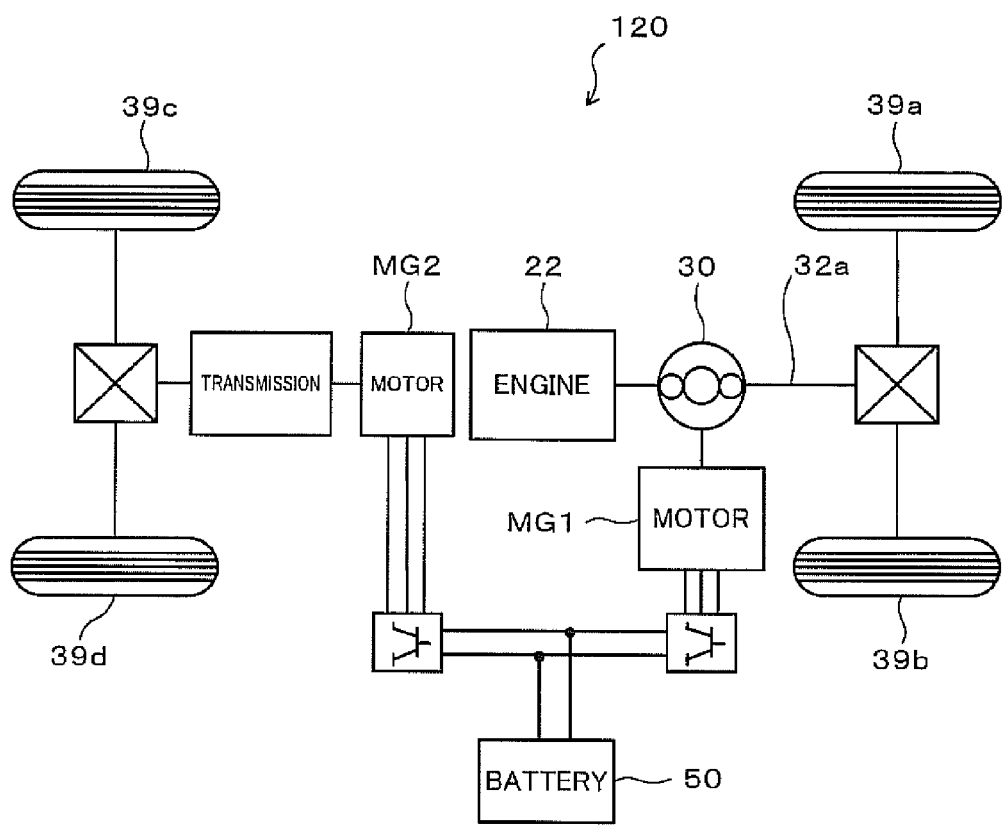
FIG. 13 is a schematic block diagram of a hybrid vehicle 120 according to a modification of the present invention.
Figure 14:
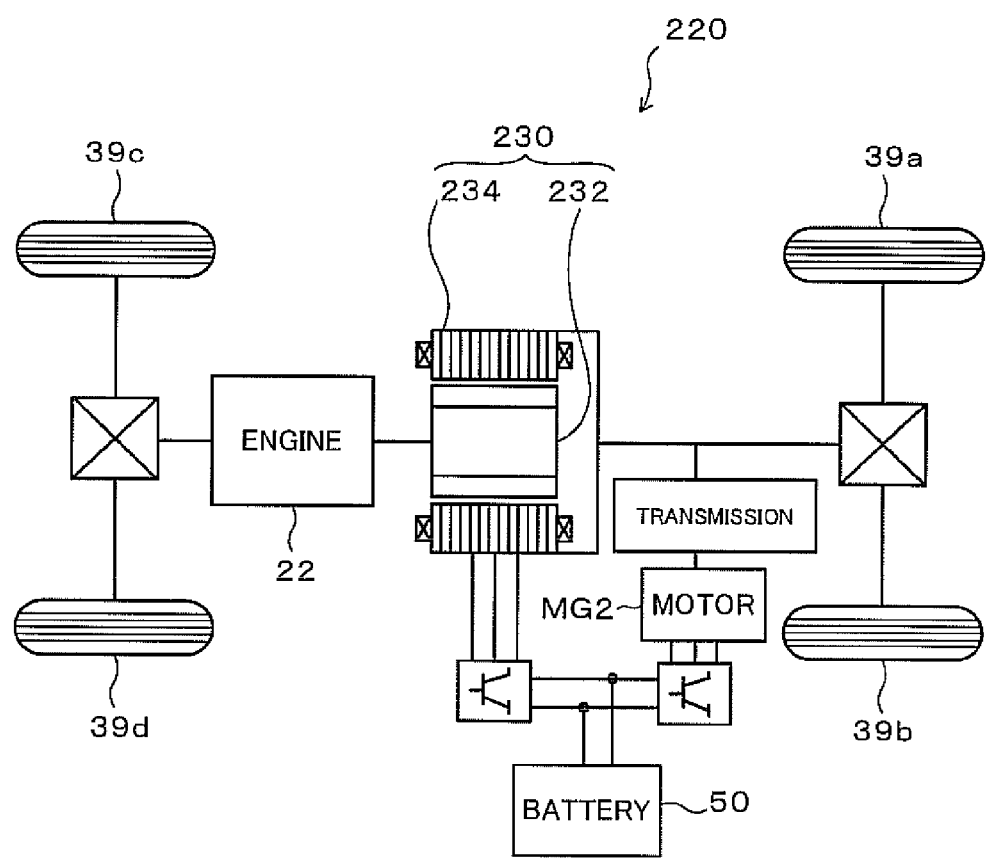
FIG. 14 is a schematic block diagram of a hybrid vehicle 220 according to a further modification of the present invention.

The same control as the drive control routine of FIG. 3 and the setting process of the target torque T* in FIG. 4 and FIG. 8-12 may be executed when the shift position SP is changed from The N position to the B position or the R position as the drive position. In the hybrid vehicle 20 of the embodiment, the reduction gear 35 may be replaced by a transmission designed to have two different speeds, for example, Hi and Lo or three or a greater number of different speeds and configured to change the rotation speed of the motor MG2 and transmit the changed rotation speed to the ring gear shaft 32a. In the hybrid vehicle 20 of the embodiment, the power of the motor MG2 is output to the axle connecting with the ring gear shaft 32a. The scope of the invention is, however, not restricted to the hybrid vehicle of this configuration. More specifically, as in a hybrid vehicle 120 as a modification example shown in FIG. 13, the present invention may also be applied to a vehicle in which the power of the motor MG2 is output to an axle (axle connected to wheels 39c and 39d in FIG. 13) that is different from the axle (axle to which the wheels 39a and 39b are connected) that is connected to the ring gear shaft 32a. Further, although the hybrid vehicle 20 of the above described embodiment is a vehicle that outputs the power of the engine 22 to the ring gear shaft 32a as an axle connected to the wheels 39a and 39b via the power distribution and integration mechanism 30, an object for application of the present invention is not limited thereto. More specifically, as in the case of a hybrid vehicle 220 as a modification example shown in FIG. 14, the present invention may also be applied to a vehicle that includes a pair-rotor motor 230 that has an inner rotor 232 connected to the crankshaft of the engine 22, and an outer rotor 234 connected to the axle that outputs the power to the wheels 39a and 39b and that transmits a part of the power output from the engine 22 to the axle while converting the remainder of the power into electric power.

The correlation between the principal elements of the embodiments and modification examples, and the principal elements of the invention described in the "Summary of the Invention" section will now be described. That is, in the above described embodiment and modification examples, the engine 22 corresponds to "internal combustion engine", the motor MG2 corresponds to "motor", the battery 50 corresponds to "accumulator", the shift lever 81 corresponds to "shift position selecting device", the accelerator pedal position sensor 84 corresponds to "accelerator operation amount acquisition device", the hybrid ECU 70 executing the setting process of the target torque T* in FIG. 4 and FIG. 8-12 corresponds to "target driving force setting module", and a combination of the hybrid ECU 70, the engine ECU 24 and the motor ECU 40 executing the drive control routine in FIG. 3 corresponds to "control module". Further, the brake ECU 95 capable of performing the Vehicle Dynamics Integrated Management corresponds to "limit driving force setting module", the VDIM release switch 88 corresponds to "limit driving force setting release device", a combination of the motor MG1 and the power distribution integration mechanism 30, and the pair-rotor motor 230 correspond to "electric power-mechanical power input output structure", the motor MG1 and the pair-rotor motor 230 correspond to "power generation motor", the power distribution integration mechanism 30 corresponds to "three shaft-type power input output assembly", the motor MG1 corresponds to "motoring device", and a combination of the hybrid ECU 70, the engine ECU 24 and the motor ECU 40 executing the N position control routine in FIG. 2 corresponds to "neutral control module".

The "internal combustion engine" is not limited to the engine 22 that receives hydrocarbon fuel such as gasoline or gas oil and outputs power, but may be of any type such as a hydrogen engine. The "motor" and the "power generation motor" are not limited to the synchronous motor generators such as the motors MG1 and MG2, but may be of any other type such as an induction motor. The "accumulator" is not limited to the secondary battery such as the battery 50, but may be of any other type such as a capacitor as long as it can supply and receive electric power to and from the motors. The "accelerator operation amount acquisition device" may be any other type as long as it can acquire the accelerator operation amount by the driver. The "control module" and the "neutral control module" may be of any type other than the combination of the hybrid ECU 70, the engine ECU 24, and the motor ECU 40. In any case, the correspondence between the main elements in the embodiment and the variant and the main elements in the invention described in "Summary of the Invention" do not limit the elements in the invention described in "Summary of the Invention" since the embodiment is an example for describing in detail the best mode for carrying out the invention described in "Summary of the Invention". Specifically, the embodiment is merely a detailed example of the invention described in "Summary of the Invention", and the invention described in "Summary of the Invention" should be construed on the basis of the description therein.

Hereinbefore, the embodiments of the present invention have been described with reference to drawings, however, the present invention is not limited to the above embodiments. It will be apparent that various modifications can be made to the present invention without departing from the spirit and scope of the present invention.

INDUSTRIAL APPLICABILITY

The technique of the invention is preferably applied to the manufacturing industries of hybrid vehicles.

What is claimed is:

1. A hybrid vehicle comprising:
   an internal combustion engine that outputs an engine driving force;
   a motor that outputs a motor driving force;
   an accumulator that supplies and receives electric power from the motor;
   a shift position selecting device that allows a driver to select a neutral position and a drive position;
   an accelerator operation amount acquisition device that acquires an accelerator operation amount by the driver;
   a limit driving force setting module that sets a limit driving force that is a target value of a total driving force of the engine driving force and the motor driving force to reduce a behavior unstable state including at least a state in which a wheel spin occurs when the hybrid vehicle is in the behavior unstable state;
   a limit driving force setting release device that allows the driver to release a setting of the limit driving force by the limit driving force setting module;
   a target driving force setting module that sets a driving force demand for driving the vehicle based on the acquired accelerator operation amount, the target driving force setting module setting a target driving force that is a target value of a driving power based on the set driving force demand in response to a non-satisfaction of a predetermined condition upon a shift from the neutral position to the drive position, the target driving force setting module setting the target driving force so as to gradually change in comparison with that on the non-satisfaction of the predetermined condition based on the set driving force demand and a predetermined gradual change restriction until a satisfaction of a predetermined release condition in response to a satisfaction of the predetermined condition upon the shift from the neutral position to the drive position, the predetermined condition being configured to gradually change the target driving force through an annealing with a time constant, the target driving force setting module setting the target driving force based on the driving force demand as well as on the non-satisfaction of the predetermined condition regardless of whether or not the predetermined condition is satisfied when the setting of the limit driving force by the limit driving force setting module is released; and a control module that controls the internal combustion engine and the motor so as to ensure the total driving force is equivalent to the set target driving force.

2. The hybrid vehicle according to claim 1, further comprising an electric power-mechanical power input output structure connected to a predetermined axle and an engine shaft of the internal combustion engine and outputting at least a part of power from the internal combustion engine to an axle side with input/output of electric power and mechanical power, the electric power-mechanical power input output structure supplying and receiving electric power from the accumulator, wherein the motor is capable of outputting power to the predetermined axle or another axle different from the predetermined axle.

3. The hybrid vehicle according to claim 2, wherein the electric power-mechanical power input output structure includes a power generation motor capable of inputting and outputting power and supplying and receiving electric power from the accumulator, and a three shaft-type power input output assembly connected with three shafts, the predetermined axle, the engine shaft of the internal combustion engine, and a rotating shaft of the power generation motor, the three shaft-type power input output assembly configured to input and output power to one remaining shaft, based on input and output of powers from and to any two shafts selected among the three shafts.

4. A control method of a hybrid vehicle including an internal combustion engine that outputs an engine driving force, a motor that outputs a motor driving force, an accumulator that supplies and receives electric power from the motor, and a shift position selecting device that allows a driver to select a neutral position and a drive position, a limit driving force setting module that sets a limit driving force that is a target value of a total driving force of the engine driving force and the motor driving force to reduce a behavior unstable state including at least a state in which a wheel spin occurs when the hybrid vehicle is in the behavior unstable state, a limit driving force setting release device that allows the driver to release a setting of the limit driving force by the limit driving force setting module, the control method comprising:

(a) setting a driving force demand for driving the vehicle based on an accelerator operation amount by the driver, the Step (a) setting a target driving force that is a target value of a driving power based on the set driving force demand in response to a non-satisfaction of a predetermined condition upon a shift from the neutral position to the drive position, the Step (a) setting the target driving force so as to gradually change in comparison with that on the non-satisfaction of the predetermined condition based on the set driving force demand and a predetermined gradual change restriction until a satisfaction of a predetermined release condition in response to a satisfaction of the predetermined condition upon the shift from the neutral position to the drive position, the predetermined condition being configured to gradually change the target driving force through an annealing with a time constant, the Step (a) setting the target driving force based on the driving force demand as well as on the non-satisfaction of the predetermined condition regardless of whether or not the predetermined condition is satisfied when the setting of the limiting driving force by the limit driving force setting module is released; and (b) controlling the internal combustion engine and the motor so as to ensure the total driving force is equivalent to the set target driving force.

* * * * *